US010062214B2

(12) United States Patent
Sun et al.

(10) Patent No.: US 10,062,214 B2
(45) Date of Patent: Aug. 28, 2018

(54) RENDERING DIGITAL VIRTUAL ENVIRONMENTS UTILIZING FULL PATH SPACE LEARNING

(71) Applicant: Adobe Systems Incorporated, San Jose, CA (US)

(72) Inventors: Xin Sun, Sunnyvale, CA (US); Nathan Carr, San Jose, CA (US); Hao Qin, Hangzhou (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 74 days.

(21) Appl. No.: 15/277,519

(22) Filed: Sep. 27, 2016

(65) Prior Publication Data

US 2018/0089894 A1   Mar. 29, 2018

(51) Int. Cl.
*G06T 15/06* (2011.01)
*G06T 19/00* (2011.01)
*H04N 5/235* (2006.01)
*G06T 7/00* (2017.01)

(52) U.S. Cl.
CPC ............ *G06T 19/006* (2013.01); *G06T 7/004* (2013.01); *G06T 7/0087* (2013.01); *G06T 15/06* (2013.01); *H04N 5/2351* (2013.01); *G06T 2207/20076* (2013.01); *G06T 2207/30244* (2013.01)

(58) Field of Classification Search
None
See application file for complete search history.

(56) References Cited

U.S. PATENT DOCUMENTS 9,013,484 B1 *  4/2015  Jakob ................... G06T 15/506
                                                      345/419
2017/0278296 A1 *  9/2017  Chui ...................... G06T 17/10

OTHER PUBLICATIONS

Agarwal, Sameer; Ramamoorthi, Ravi; Belongie, Serge; Jensen, Henrik W.; "Structured Importance Sampling of Environment Maps;" Published in: Proceeding Siggraph '03 ACM SIGGRAPH 2003 Papers.
Georgiev, I.; Krivanek, J.; Davidovic, T.; Slusallek, P.; "Light Transport Simulation with Vertex Connection and Merging;" 23rd International Conference on Transport Theory, Santa Fe, NM, USA, Sep. 15-20, 2013.
Gorur, Dilan; Rasmussen, Carl E.; "Dirichlet Process Gaussian Mixture Models: Choice of the Base Distribution;" Journal of Computer Science and Technology 25(4): 615-626 Jul. 2010.

(Continued)

*Primary Examiner* — Diane Wills
(74) *Attorney, Agent, or Firm* — Keller Jolley Preece

(57) ABSTRACT

The present disclosure includes methods and systems for rendering digital images of a virtual environment utilizing full path space learning. In particular, one or more embodiments of the disclosed systems and methods estimate a global light transport function based on sampled paths within a virtual environment. Moreover, in one or more embodiments, the disclosed systems and methods utilize the global light transport function to sample additional paths. Accordingly, the disclosed systems and methods can iteratively update an estimated global light transport function and utilize the estimated global light transport function to focus path sampling on regions of a virtual environment most likely to impact rendering a digital image of the virtual environment from a particular camera perspective.

20 Claims, 14 Drawing Sheets

(56) References Cited

OTHER PUBLICATIONS

Hachisuka, Toshiya; Pantaleoni, Jacopo; Jensen, Henrik W.; "A Path Space Extension for Robust Light Transport Simulation"; Publication Date: Nov. 1, 2012; ACM Transactions on Graphics (TOG) Proceedings of ACM SIGGRAPH Asia 2012; vol. 31 Issue 6.
Hachisuka, Toshiya; Kaplanyan, Anton S.; Dachsbacher, Carsten; "Multiplexed Metropolis Light Transport"; Publication Date: Jul. 27, 2014; ACM Transactions on Graphics (TOG)—Proceedings of ACM SIGGRAPH 2014, vol. 33 Issue 4.
Hachisuka, Toshiya; Jensen, Henrik W.; "Robust Adaptive Photon Tracing Using Photon Path Visibility"; Publication date: Oct. 2011; ACM Transactions on Graphics, vol. 30, No. 5, Article 114.
Iba, Yukito; "Population Monte Carlo algorithms"; Submitted on Aug. 16, 2000 (v1), last revised Apr. 11, 2001 (this version, v2); The Institute of Statistical Mathematics, Tokyo, Japan; Journal reference: Transactions of the Japanese Society for Artificial Intelligence, vol. 16 No. 2, pp. 279-286.
Jensen, H. W. 2001. Realistic Image Synthesis Using Photon Mapping. A. K. Peters, Ltd., Natick, MA, USA.
Kajiya, James T.; "The Rendering Equation"; Publication date: Aug. 31, 1986; SIGGRAPH '86 Proceedings of the 13th annual conference on Computer graphics and interactive techniques, vol. 20 Issue 4, pp. 143-150.
Kalos, Malvin H.; Whitlock, Paula A.; *Monte Carlo Methods*, 2nd Edition, Published by Wiley-VCH, Oct. 2008; 215 pages; ISBN: 978-3-527-40760-6.
Kelemen, Csaba; Szirmay-Kalos, Laszlo; Antal, Gyorgy; Csonka, Ferenc; "A Simple and Robust Mutation Strategy for the Metropolis Light Transport Algorithm"; Published Sep. 2002; Computer Graphics Forum; vol. 21, Issue 3.

Lafortune, Eric P.; Willems, Yves D.; "Bi-Directional Path Tracing"; Proceedings of Third International Conference on Computational Graphics and Visualization Techniques (Compugraphics '93), p. 145-153, Alvor, Portugal, Dec. 1993.
Lai, Yu-Chi; Fan, Shao H.; Chenney, Stephen; Dyer, Charcle; "Photorealistic Image Rendering with Population Monte Carlo Energy Redistribution"; Publication Date: Jun. 25, 2007; Published in: EGSR'07 Proceedings of the 18th Eurographics conference on Rendering Techniques; pp. 287-295.
Lawrence, Jason; Rusinkiewicz, Szymon; Ramamoorthi, Ravi; "Efficient BRDF Importance Sampling Using a Factored Representation"; Publication Date: Aug. 8, 2004; Published in: SIGGRAPH '04 ACM SIGGRAPH 2004 Papers; pp. 496-505.
Neal, R.; "Markov Chain Sampling Methods for Dirichlet Process Mixture Models"; Journal of Computational and Graphical Statistics, vol. 9, No. 2. (Jun. 2000), pp. 249-265.
Veach, Eric; Guibas, Leonidas; "Bidirectional Estimators for Light Transport"; Eurographics Rendering Workshop 1994 Proceedings (Darmstadt, Germany, Jun. 1994), pp. 147-162.
Veach, Eric; Guibas, Leonidas "Metropolis Light Transport"; SIGGRAPH 97 Proceedings (Aug. 1997), Addison-Wesley, pp. 65-76.
Veach, Eric; "Robust Monte Carlo Methods for Light Transport Simulation"; Ph.D. dissertation, Stanford University, Dec. 1997.
Vorba, Jiri; Karlik, Ondrej; Sik, Martin; Ritschel, Tobias; Krivanek, Jaroslav; "On-line Learning of Parametric Mixture Models for Light Transport Simulation"; Publication Date: Jul. 27, 2014; Published in ACM Transactions on Graphics (TOG)—Proceedings of ACM SIGGRAPH 2014; vol. 33 Issue 4.
Wraith, Darren; Kilbinger, Martin; Benabed, Karim; Cappe, Olivier; Cardoso, Jean-Francois; Fort, Gersende; Prunet, Simon; Robert, Christian P.; "Estimation of Cosmological Parameters Using Adaptive Importance Sampling"; Article in: Physical review D: Particles and fields • Mar. 4, 2009.

* cited by examiner

RENDERING DIGITAL VIRTUAL ENVIRONMENTS UTILIZING FULL PATH SPACE LEARNING

BACKGROUND

Recent years have seen rapid development in digital image rendering technology. Indeed, due to advances in algorithms and hardware, conventional digital rendering systems are now able to generate high quality, photo-realistic digital images in relation to a variety of virtual environments. For example, existing systems can generate digital images of virtual environments in the context of video games, construction modeling, movies, advertising, or entertainment.

Although conventional digital rendering systems are capable of producing high-quality digital images of virtual environments, such systems also have a number of shortcomings. For example, conventional digital rendering systems take a significant amount of time and computing resources (e.g., processing power) to render digital images of virtual environments. Indeed, conventional digital rendering systems can take hours to resolve variance and generate accurate, unbiased photo-realistic digital images of a virtual environment.

The time required to synthesize digital images of virtual environments is largely controlled by the complexity of tracking light from light sources within the virtual environment. For example, to render digital images that accurately reflect light from light sources in a virtual environment, some conventional digital systems randomly cast rays from a light source. By brute force, such conventional digital systems ultimately cast rays from a light source that connect to a camera perspective and contribute to rendering the digital image.

Some other conventional digital systems seek to increase the efficiency of random ray casting by sampling rays, analyzing local features of vertices intersected by the rays, and sampling additional rays from the vertices based on the local features. Such conventional digital systems attempt to render virtual environments by tracing consecutive ray segments sequentially along vertices in a virtual environment utilizing this local information (such as illumination and material properties). This process of sequentially sampling individual ray segments from individual vertices requires an exorbitant amount of time and significant computational resources.

These and other problems exist with regard to rendering accurate, un-biased digital images of virtual environments.

BRIEF SUMMARY

One or more embodiments of the present disclosure provide benefits and/or solve one or more of the foregoing or other problems in the art with systems and methods that render digital images of a virtual environment by estimating global light transport across full light paths. Specifically, the disclosed systems and methods iteratively estimate a global light transport function and utilize the estimated global light transport function to focus path sampling on significant regions likely to transport light across full light paths between a light source and a camera perspective. By focusing path sampling based on the approximated global light transport function between the light source and the camera perspective, the disclosed systems and methods more efficiently focus time and resources on areas of a virtual environment most likely to transfer light to the camera perspective. In this manner, the disclosed systems and methods significantly reduce the amount of time and processing power required to render a digital image of a virtual environment.

For example, in one or more embodiments, the disclosed systems and methods sample a first plurality of paths in a virtual environment to determine point estimations of light transfer between a light source and a camera perspective using a uniform distribution. In addition, the disclosed systems and methods approximate a global light transport function across full light paths between the light source and the camera perspective using the determined point estimations. The disclosed systems and methods sample a second plurality of paths in the virtual environment using a non-uniform distribution based on the approximated global light transport function across full light paths. Moreover, the disclosed systems and methods create a digital image of the virtual environment from the camera perspective based on the sampled paths.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

The detailed description is described with reference to the accompanying drawings in which.

DETAILED DESCRIPTION

Figure 1A:
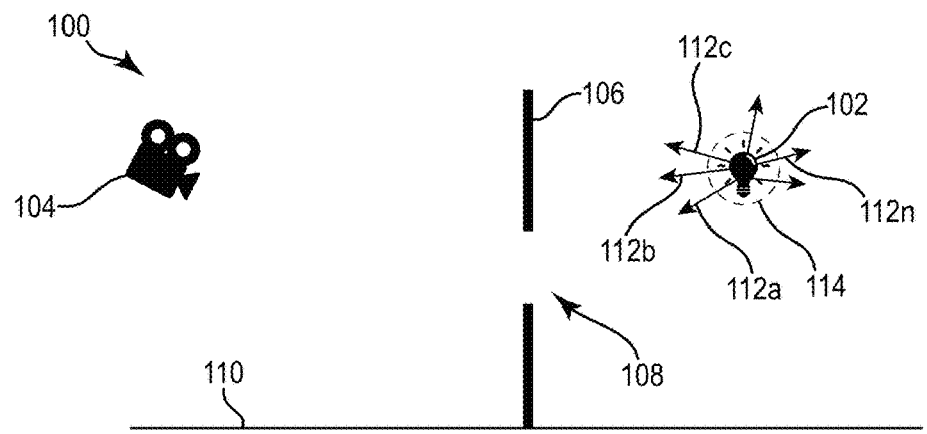
FIG. 1A illustrates a representation of sampling paths in accordance with one or more embodiments.

One or more embodiments of the present disclosure include a digital full path rendering system that generates digital images of a virtual environment by approximating a global light transport function between one or more light sources and a camera perspective. As discussed below, a "camera perspective" refers to a point of view of a camera within a virtual environment from which a digital image will be rendered. In one or more embodiments, the digital full path rendering system iteratively samples paths, utilizes the sampled paths to estimate a global light transport function, and then utilizes the estimated global light transport function to direct additional path sampling. To illustrate, in one or more the digital full path system samples paths in a virtual environment and determines the amount of light transferred between a light source and a camera perspective along the sampled paths. The digital full path rendering system then utilizes the information gleaned from the sampled paths (i.e., the amount of light transfer between the light source and the camera perspective along the sampled paths) to estimate a global light transport function (i.e., a function that defines a likelihood of transporting light along any particular path from the light source to the camera perspective). Moreover, the digital full path rendering system utilizes the estimated global light transport function to target particular regions with further path sampling. In this manner, the digital full path rendering system iteratively refines the approximated global light transport function and more efficiently sample paths significant during rendering of a virtual environment.

In one or more embodiments, the digital full path rendering system samples a first plurality of paths in a virtual environment to determine point estimations of light transfer between a light source and a camera perspective using a uniform distribution. In addition, the digital full path rendering system approximates a global light transport function across full light paths between the light source and the camera perspective using the determined point estimations. Further, the digital full path rendering system samples a second plurality of paths in the virtual environment using a non-uniform distribution based on the approximated global light transport function across full light paths. Moreover, the digital full path rendering system creates a digital image of the virtual environment from the camera perspective based on the first plurality of paths and the second plurality of paths.

By approximating a global light transport function (and sampling paths based on the approximated global light transport function), the digital full path rendering system reduces the time and computational power required to render digital images of a virtual environment. In particular, because the digital full path rendering system considers global features of a virtual environment along full light paths, the digital full path rendering system more quickly targets particular regions of a virtual environment likely to be significant in rendering the digital image. Indeed, in one or more embodiments, the digital full path rendering system actively learns how light flows between a light source and a camera perspective on the fly while rendering the digital image to significantly reduce the time and resources required to render the digital image.

By taking into account global factors in generating a global light transport function, the digital full path rendering system also significantly reduces the number of samples required to render a digital image of a virtual environment and the amount of time required to generate the samples. Correspondingly, the digital full path rendering system reduces wasted time and processing power associated with conventional systems that inefficiently cast and analyze rays that are unlikely to contribute to full light paths. For example, the digital full path rendering system can significantly reduce processing time in comparison to systems that sample rays randomly or sample rays based on localized features.

Significantly, the digital full path rendering system achieves these reductions in time and processing power without sacrificing accuracy or integrity in the resulting digital image. Indeed, it will be appreciated that some conventional systems seek to increase speed in generating a digital image by utilizing filtering or blurring algorithms that produce biased results (e.g., digital images that do not portray a truly realistic representation of the virtual environment). In contrast, the digital full path rendering system produces unbiased digital images while removing variance in the digital image more quickly and efficiently than conventional systems.

As mentioned above, in one or more embodiments, the digital full path rendering system samples paths from a virtual environment and utilizes the sampled paths to approximate a global light transport function. More specifically, in one or more embodiments the digital full path rendering system samples paths and estimates point estimations of light transfer corresponding to each sampled path. For example, the digital full path rendering system can sample a path with two path segments, and determine a point estimation of light intensity transfer across the two path segments as light travels between a light source and a camera perspective.

As discussed above, the digital full path rendering system accounts for a variety of global factors in determining point estimations of light transfer. For example, the digital full path rendering system can account for general features, such as light direction, light type, or occlusions in the virtual environment in approximating a global light transport function and utilizing the approximated global light transport function to sample additional paths. In addition, the digital full path rendering system can account for local features, such as material variations or reflection angles within the virtual environment. By considering both general and localized features, the digital full path rendering system more efficiently targets paths most likely to contribute to light transfer between a light source and a camera perspective.

In addition, as mentioned above, in one or more embodiments the digital full path rendering system utilizes an estimated global light transport function to sample additional paths. For example, in one or more embodiments, the digital full path rendering system utilizes sampled paths to generate a plurality of Gaussian functions that estimate the global light transport function (e.g., utilizing Population Monte Carlo techniques to build a Gaussian mixture model). The digital full path rendering system then utilizes the Gaussian functions to sample additional paths, which are then utilized to further modify the Gaussian functions. In this manner, one or more embodiments progressively refine the estimated global light transport function to be more proportional to the light transport paths of the virtual environment.

By utilizing Gaussian functions to estimate the global light transport function, the digital full path rendering system reduces processing power needed to sample paths. Indeed, because Gaussian functions are relatively simple models to generate and manage, the digital full path rendering system can estimate a complex global light transport function with relatively light-weight Gaussian approximations. In this manner, the digital full path rendering system decreases demand on computer processing while increasing the speed of path sampling and digital image rendering.

It will be appreciated that an initial estimate of Gaussian functions can impact the accuracy of the resulting approximation of the global light transport function. For example, the initial number of Gaussian functions utilized to estimate the global light transport function can impact the accuracy of the resulting model. Accordingly, in one or more embodiments, the digital full path rendering system utilizes a statistical analysis (e.g., a Dirichlet process) to generate an initial estimate of a number of Gaussian functions prior to sampling additional paths. In particular, the digital full path rendering system can statistically analyze previously sampled paths and utilize the previously sampled paths to generate, remove, or modify Gaussian functions. In this manner, the digital full path rendering system can generate an initial number of Gaussians to utilize in sampling additional paths.

In one or more embodiments, the digital full path rendering system further improves rendering of a virtual environment by combining (or jointly developing) Gaussians having different dimensions to more efficiently estimate a global light transport function. Indeed, it will be appreciated that high dimensionality of paths in a global light transport function can increase the complexity and time required to estimate the global light transport model. Further, estimating a global light transport function across multiple dimensions can introduce redundant distribution calculations and a constantly increasing number of Gaussian functions utilized to estimate the distribution across multiple dimensions.

Accordingly, in one or more embodiments, the digital full path rendering system combines Gaussians of different dimensions. In particular, rather than separately estimating the global light transport function with Gaussian functions for a plurality of dimensions, the digital full path rendering system utilizes combination weights to jointly fit Gaussian functions for a plurality of dimensions to the global light transport function (e.g., utilizing multiple importance sampling techniques). In this manner, the digital full path rendering system avoids generating redundant distributions across multiple dimensions. Moreover, the digital full path rendering system reduces the complexity of estimating global light transport functions.

In addition to jointly fitting Gaussian functions having multiple dimensions, in one or more embodiments, the digital full path rendering system further improves the efficiency of rendering virtual environments by utilizing bi-directional sampling. For example, in one or more embodiments, the digital full path rendering system samples paths originating from a light source and also samples paths originating from a camera perspective. The digital full path rendering system can utilize combination weightings (e.g., multiple importance sampling techniques) to join paths originating from the light source and paths originating from the camera perspective in estimating a global light transport function. By utilizing paths originating from the camera perspective and paths originating from the global light transport function to generate and analyze full light paths, the digital full path rendering system can additionally improve the efficiency of estimating a global light transport function.

Additional detail will now be provided regarding the digital full path rendering system in relation to illustrative figures portraying exemplary embodiments. FIGS. 1A-1D illustrate a representation of sampling paths, utilizing paths to estimate a global light transport function, and utilizing the global light transport function to sample additional paths in rendering a digital image of a virtual environment. In particular, FIG. 1A illustrates a virtual environment 100, with a light source 102 and a camera perspective 104 separated by a barrier 106 (e.g., a wall). In particular, the barrier 106 contains a hole 108 and connects to a floor 110 (i.e., such that light must pass through the hole 108 to travel from the light source 102 to the camera perspective 104). As shown in FIG. 1A, the digital full path rendering system samples a plurality of paths 112a-112n to render the virtual environment 100.

As used herein, the term "virtual environment" refers to a digital representation of a three-dimensional space. In particular, the term "virtual environment" includes a digital representation of a three-dimensional space reflecting a real or fictional landscape that a user seeks to render in a digital image. For example, the term "virtual environment" includes a digital landscape for a video game, a digital three-dimensional model of a building under construction, or a digital model of a fictional world portrayed in a movie. Thus, in relation to FIG. 1A, the virtual environment 100 comprises a digital three-dimensional representation of the barrier 106, the floor 110, and the light source 102.

As used herein, the term "light source" refers to a digital representation of an object that emits light. In particular, the term "light source" refers to a digital representation of an object that emits light at a particular location within a virtual environment. A light source can emit any type or variety of light. For example, the light source can emit a variety of colors, shades, hues, or wavelengths. Similarly, a light source can emit light in a particular direction (e.g., a flashlight pointed in a particular direction) or in a particular shape (e.g., a light source with a conical shade that emits light rays in a conical shape). As illustrated in FIG. 1A, the light source 102 comprises a digital representation of a light bulb that emits light rays in the virtual environment 100, including toward the camera perspective 104.

As used herein, the term "camera perspective" refers to a point of view in a virtual environment. In particular, the term "camera perspective" refers to a point of view of a camera represented within a virtual environment from which a digital image will be rendered. For instance, the term "camera perspective" includes a point of view from which a user seeks to render a digital image of the virtual environment. To illustrate, in a first-person video game, a camera perspective includes the point of view from which the virtual environment of the video game is portrayed. In relation to FIG. 1A, the camera perspective 104 reflects the point of view from which the digital full path rendering system renders a digital image of the virtual environment 100.

As discussed previously, in one or more embodiments, the digital full path rendering system samples paths in a virtual environment. As used herein, the term "path" refers to a route between at least two locations (e.g., two vertices) in a virtual environment. In particular, the term "path" includes a vector describing a route of potential light transport within a virtual environment. A path can be represented in a variety of forms. For example, a path can comprise a digital item defining a ray cast in a direction from an initial location into a virtual environment. In addition, a path can comprise a vector that defines an altitude and azimuth of one or more path segments making up a path. Similarly, a path can comprise a vector that defines a starting vertex and ending vertex of one or more path segments making up a path. As used herein, the term "path segment" refers to a portion of a path between two locations. In particular, the term "path segment" includes a line between two vertices of a path. To illustrate, light that travels from a light source, bounces off an object, and reflects to a camera perspective follows a path with two path segments (i.e., a first path segment from the light source to the object and a second path segment from the object to the camera perspective).

Similarly, as used herein, the term "full light path" refers to a route that connects a light source and a camera perspective. In particular, the term "full light path" refers to a route that permits light transport from a light source to a camera perspective within a virtual environment. Accordingly, a "full light path" can comprise one or more paths (with one or more individual path segments) connecting a light source and a camera perspective.

As mentioned previously, in one or more embodiments, the digital full path rendering system samples paths of a virtual environment according to a uniform distribution and utilizes the sampled paths to obtain point estimations of light transfer for estimating a global light transport function.

As used herein, the term "point estimation of light transfer" refers to a measure of light transported along a path. In particular, the term "point estimation of light transfer" includes a measure of light transported along a path between a light source and a camera perspective. A point estimation of light transfer can be determined, identified, measured, or presented in a variety of forms. For example, a point estimation of light transfer can include a measure of intensity, energy, impact, or importance. Thus, for instance, a point estimation of light transfer can include a measure of importance of a path in transferring light between a light source and a camera perspective in a virtual environment. Similarly, a point estimation of light transfer can reflect the likelihood that a path contributes to a full light path.

Further, as used herein, the term "global light transport function" refers to a model of light transfer between a light source and a camera perspective in a virtual environment. In particular, the term "global light transport function" includes a model of paths that transfer light from a light source to a camera perspective along one or more full light paths in a virtual environment. Similar to point estimations of light transfer, a global light transport function can model light transfer within a virtual environment utilizing a variety of measures, including intensity, energy, impact, or importance. Moreover, a global light transport function can take a variety of forms. For example, in one or more embodiments, the digital full path rendering system estimates a global light transport function as a probability distribution that reflects the likelihood of importance of one or more paths in transferring light from a light source to a camera perspective. Similarly, in one or more embodiments, the digital full path rendering system estimates a global light transport function with a plurality of Gaussian functions (i.e., Gaussian mixture model) that, collectively, reflect the probability of importance of one or more paths in transferring light from a light source to a camera perspective.

For example, FIG. 1A illustrates the digital full path rendering system sampling a plurality of paths $112a$-$112n$ for estimating a global light transport function. More particularly, FIG. 1A illustrates the digital full path rendering system sampling the paths $112a$-$112n$ according to a uniform distribution 114.

As shown, by sampling the paths $112a$-$112n$ according to the uniform distribution 114 the digital full path rendering system generates paths that emanate in a variety of different directions within the virtual environment 100. Indeed, at the outset, the digital full path rendering system has little information regarding light transport within the virtual environment 100. Accordingly, the digital full path rendering system casts the paths $112a$-$112n$ in a variety of directions to obtain information regarding the virtual environment 100 to guide future path sampling.

Although FIG. 1A illustrates utilizing the uniform distribution 114, it will be appreciated that the digital full path rendering system can utilize a variety of different distributions at the outset to obtain information regarding the virtual environment 100 to refine further sampling.

Moreover, it will be appreciated that the digital full path rendering system can sample any type or variety of paths. For example, FIG. 1A illustrates sampling paths by casting individual rays (i.e., single path segments) from the light source 102 into the virtual environment 100 (e.g., using a ray casting algorithm). In addition to sampling paths with one path segment, the digital full path rendering system can also sample paths with additional numbers of path segments. For example, in one or more embodiments, the digital full path system samples paths with five or more path segments.

Figure 1B:
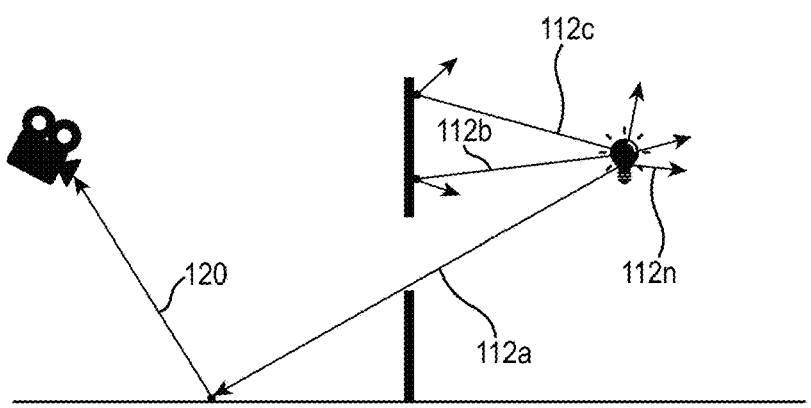
FIG. 1B illustrates a representation of determining point estimations based on a sampled path in accordance with one or more embodiments.

As mentioned, in one or more embodiments, the digital full path rendering system generates point estimations of light transfer based on sampled paths. In particular, the digital full path rendering system determines point estimations of light transfer between a light source and a camera perspective along full light paths corresponding to the sampled paths. For example, as illustrated in FIG. 1B, the digital full path rendering system determines that the path $112a$ is part of a full light path 120 (e.g., by sampling a plurality of light paths having two path segments, including the full light path 120, and determining that the path $112a$ is part of the full light path 120). Moreover, the digital full path rendering system determines an estimation of light transfer along the path $112a$ (e.g., an intensity of light that travels from the light source 102, via the path $112a$, to the camera perspective 104).

Similarly, the digital full path rendering system determines that the paths $112b$ and $112c$ intersect the barrier 106 (and do not correspond to any full light paths). Accordingly, the digital full path rendering system determines a corresponding estimation of light transfer between the light source 102 and the camera perspective 104 corresponding to the paths $112b$, $112c$ (i.e., no light transfer along the paths $112b$, $112c$).

As discussed previously, in determining an estimation of light transfer, the digital full path rendering system can consider a variety of factors impacting light transport. For example, as displayed in relation to the paths $112a$-$112c$ the digital full path rendering system accounts for occlusions in the virtual environment 100 that prohibit a path from transferring light between the light source 102 and the camera perspective 104. In addition, the digital full path rendering system can account for local factors that impact light transport. For example, in determining an amount of light transport along the path 112a, the digital full path rendering system accounts for the material or reflectivity angle corresponding to the floor 110.

To illustrate, if the material properties of the floor 110 are such that no light will transport along the full light path 120 (e.g., the reflectivity angle will refract light in a different direction that will not reach the camera perspective 104), the digital full path rendering system accounts for these material properties in determining a point estimation of light transfer along the path 112a (e.g., the digital full path rendering system can determine that the point estimation of light transfer along the path 112a is minimal with regard to the full light path 120). In this manner, the digital full path rendering system can utilize any variety of global factors to determine a point estimation of light transfer between a light source and a camera perspective via sampled paths in a virtual environment.

Indeed, as shown in FIGS. 1A-1B, the digital full path rendering system samples a plurality of paths 112a-112n and obtains point estimations of light transfer corresponding to each of the sampled paths. Specifically, the digital full path rendering system gleans information regarding light transfer between the light source 102 and the camera perspective 104 within the virtual environment 100 corresponding to the sampled paths.

Figure 1C:
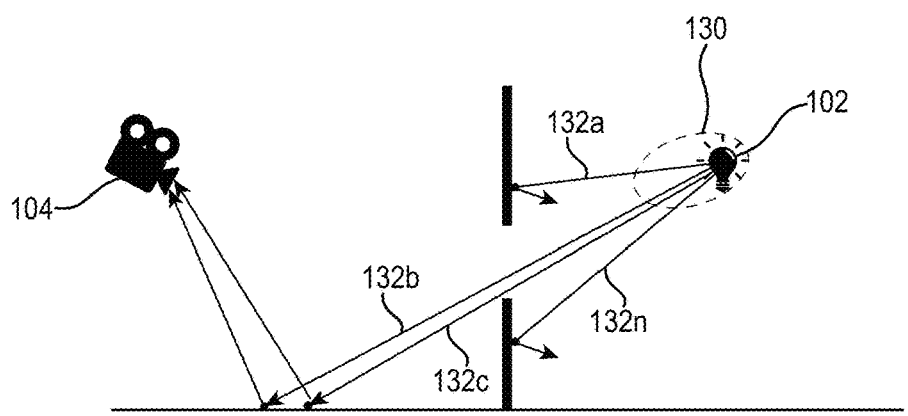
FIG. 1C illustrates sampling additional paths based on an approximated global light transport function in accordance with one or more embodiments.

As mentioned above, in one or more embodiments, the digital full path rendering system utilizes point estimations of light transfer corresponding to sampled paths to estimate a global light transport function and using the global light transport function to direct future path sampling. For example, FIG. 1C illustrates using a distribution 130 based on an estimated global light transport function to sample a second plurality of paths 132a-132n within the virtual environment 100.

The digital full path rendering system determines the estimated global light transport function based on the plurality of paths 112a-112n. More specifically, the digital full path rendering system determines the estimated global light transport function based on the point estimations of light transfer between the light source 102 and the camera perspective 104 resulting from the plurality of paths 112a-112n. In particular, the digital full path rendering system utilizes the point estimations of light transfer resulting from the plurality of paths 112a-112n together with an expectation maximization procedure to approximate a probability distribution that estimates the global light transport function (i.e., a probability distribution that estimates light transfer along paths in the virtual environment). For example, as described in greater detail below, in one or more embodiments, the digital full path rendering system utilizes a Monte Carlo estimation to generate a plurality of Gaussian functions (i.e., Gaussian mixture model) that, together, make up the estimated global light transport function.

Notably, the paths 132a-132n are more focused in regions of the virtual environment 100 with a higher likelihood of connecting the light source 102 and the camera perspective 104. Indeed, because the estimated global light transport function 130 reflects a likelihood that paths will transport light from the light source 102 to the camera perspective 104, sampling paths based on the estimated global light transport function results in more focused, relevant path sampling.

In one or more embodiments, the digital full path rendering system scales (or weights) the resulting point estimations to avoid generating biased results. Indeed, in sampling paths utilizing a non-uniform distribution 130 (e.g., based on the estimated global light transport function) the digital full path rendering system purposefully targets particular areas of significance in the virtual environment 100. Targeting paths based on a non-uniform distribution naturally produces biased measures of light transport (e.g., higher collective light transport measures in higher sampled regions of the virtual environment). Accordingly, as described in greater detail below, the digital full path rendering system weights the point estimations of light transfer based on the non-uniform distribution to ensure that the digital full path rendering system produces unbiased results.

The digital full path rendering system further utilizes the sampled paths 132a-132n to refine the estimated global light transport function 130. For example, the digital full path rendering system can determine that the paths 132b, 132c correspond to full light paths and determine point estimations of light transfer corresponding to the paths 132b, 132c. Similarly, the digital full path rendering system determines that the paths 132a, 132n intersect the barrier 106 and determine point estimations of light transfer corresponding to the paths 132a, 132n. The digital full path rendering system then utilizes the point estimations of light transfer to further refine the estimated global light transport function (e.g., modify Gaussian functions based on the point estimations of light transfer). Specifically, in one or more embodiments, the digital full path rendering system utilizes adaptive importance sampling (such as a population Monte Carlo algorithm) to sample paths and update the estimated global light transport function.

In this manner, the digital full path rendering system iteratively samples paths in a virtual environment, utilizes the paths to determine updated estimates of a global light transport function, and further sample paths based on the updated estimates of the global light transport function. At each iteration, the digital full path rendering system more accurately estimates the global light transport function and more precisely targets those paths of the virtual environment with an increased likelihood of contributing to light transfer between a light source and a camera perspective.

Figure 1D:
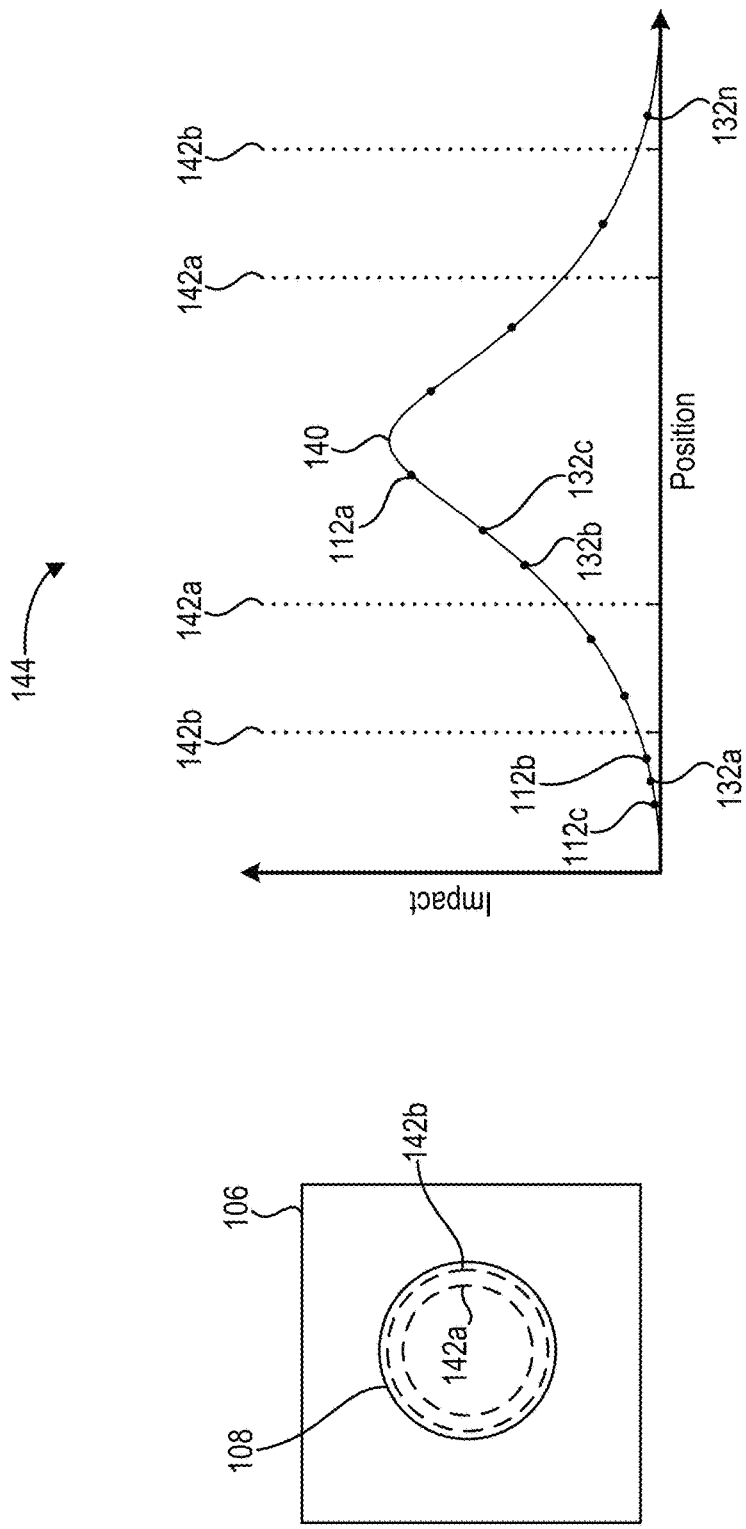
FIG. 1D illustrates a representation of estimating a global light transport function with a Gaussian in accordance with one or more embodiments.

For example, FIG. 1D illustrates a visual representation of an estimated global light transport function in the form of a Gaussian function 140 (with deviation measures 142a, 142b, such as standard deviations) based on the sampled paths of FIGS. 1A-1C. In particular, FIG. 1D illustrates the Gaussian function 140 as both a graph and as a distribution overlay on the barrier 106.

As shown in the graph 144, the digital full path rendering system generates the Gaussian function 140 based on point estimations of light transfer corresponding to the paths 112a-112n and 132a-132n. In particular, as shown, each point estimation of light transfer corresponding to the paths 112a-112n and 132a-132n contribute to defining the Gaussian function 140.

Moreover, as shown in relation to the barrier 106, the Gaussian function 140 provides an indication of paths that are likely to transfer light from the light source 102 to the camera perspective 104. In particular, the Gaussian function 140 indicates that paths within the hole 108 are more likely to transfer light from the light source 102 to the camera perspective 104. Accordingly, the digital full path rendering system can utilize the Gaussian function 140 to sample additional paths that are more likely to transfer light between the light source 102 and the camera perspective 104.

Although the Gaussian function 140 is represented as having a single dimension in the graph 144 (i.e., a position dimension as a function of light transport impact) it will be appreciated that the digital full path rendering system can utilize Gaussian functions having a variety of different dimensions. For instance, in one or more embodiments, the digital full path rendering system determines Gaussian functions corresponding to the dimensionality of paths sampled from the virtual environment.

Indeed, it will be appreciated that the dimensionality of a particular path corresponds to the number of path segments making up the path. To illustrate, paths with a single path segment will generally have two dimensions (i.e., a vector with an altitude and an azimuth). Similarly, paths comprising two path segments will generally have four dimensions (i.e., an altitude and an azimuth for the first path segment and an altitude and an azimuth for the second path segment). Accordingly, although the Gaussian function 140 in the graph 144 is represented as charting a single position dimension against importance, if the Gaussian function 140 is built from sampled paths having one segment, the digital full path rendering system can generate the Gaussian function 140 such that it has two dimensions (as shown in the distribution overlay of the barrier 106). Similarly, if the Gaussian function 140 is built from sampled paths having two segments, the digital full path rendering system can generate the Gaussian function 140 such that it has four dimensions.

Accordingly, it will be appreciated that the digital full path rendering system can utilize Gaussian functions with different dimensionalities to sample paths. For example, in one or more embodiments, the digital full path rendering system utilizes Gaussian functions with four dimensionalities to sample paths having two path segments. Indeed, in this manner, the digital full path rendering system samples paths with multiple path segments in regions that are more likely to result in light transfer between a light source and a camera perspective.

Furthermore, although FIG. 1D illustrates a single Gaussian function as an estimate of a global light transport function within the virtual environment 100, it will be appreciated that the digital full path rendering system can utilize a plurality of different Gaussian functions to estimate a global light transport function. Indeed, in relation to virtual environments with complex geometric configurations and complex light paths, the global light transport function will often comprise a complex function that the digital full path rendering system estimates with a plurality of Gaussian function (i.e., a Gaussian mixture model).

Indeed, in one or more embodiments, the digital full path rendering system conducts an additional statistical analysis to identify a number of Gaussian functions to utilize in generating an estimated global light transport function. In particular, in one or more embodiments, the digital full path rendering system conducts a statistical analysis to identify a number of Gaussian functions (and an initial location and variance of the Gaussian functions) prior to sampling paths.

More specifically, in one or more embodiments, the digital full path rendering system applies a Dirichlet process that analyzes previously sampled paths and identifies an initial number of Gaussian functions (together with an initial location of the Gaussian functions) prior to applying a population Monte Carlo algorithm to sample and update an estimated global light transport function. Specifically, in one or more embodiments the digital full path rendering system applies a Dirichlet process that statistically analyzes each previously sampled path (i.e., point estimations corresponding to each previously sampled path) and determines if the sampled path should be assigned to an existing Gaussian or assigned to a new Gaussian function.

Figure 2A:
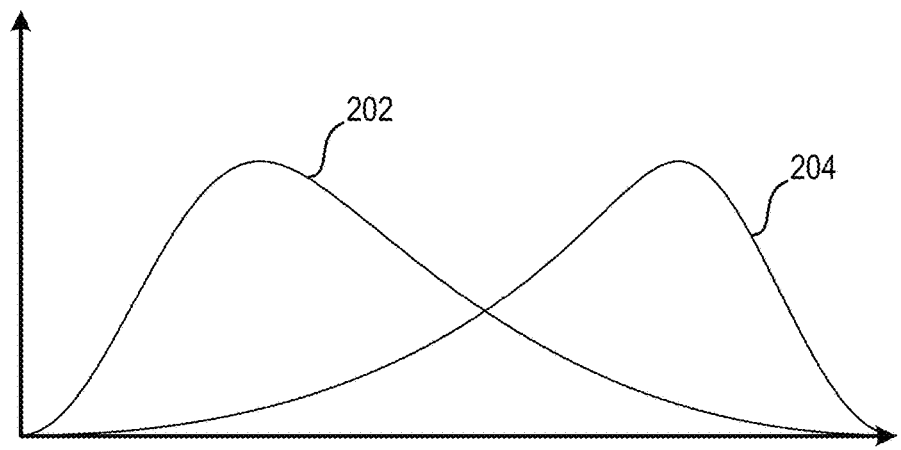
FIGS. 2A-2D illustrates a representation of utilizing a Dirichlet process to identify an initial number of Gaussian functions in accordance with one or more embodiments.

For example, FIGS. 2A-2D illustrates a representation of operation of a Dirichlet process in accordance with one or more embodiments. In particular, FIG. 2A illustrates a first Gaussian function 202 and a second Gaussian function 204 (e.g., Gaussian functions determined based on previously sampled paths and application of population Monte Carlo algorithm). The digital full path rendering system iterates through each point estimation corresponding to previously sampled paths and determines whether each point estimation should be assigned to an existing Gaussian or a new Gaussian.

Figure 2B:
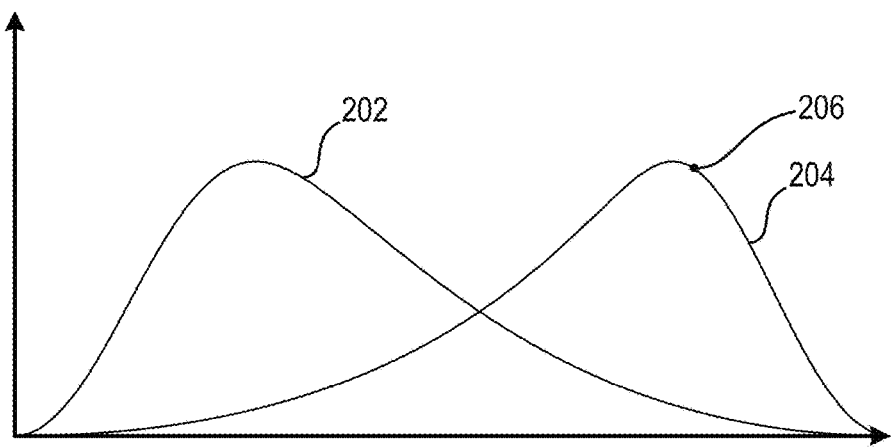

Thus, as shown in FIG. 2B, the digital full path rendering system analyses a point estimation 206 (i.e., a point estimation of light transfer corresponding to a previously sampled path). The digital full path rendering system determines a first probability that the point estimation 206 corresponds to the second Gaussian 204 (and/or the first Gaussian 202). The digital full path rendering system also determines a second probability that the point estimation 206 corresponds to a new Gaussian (i.e., does not statistically match any existing Gaussian). In relation to FIG. 2B, the digital full path rendering system determines that that the first probability (i.e., that the point estimation 206 corresponds to the second Gaussian 204) is greater than the second probability (i.e., that the point estimation 206 corresponds to a new Gaussian). Accordingly, the digital full path rendering system assigns the point estimation 206 to the second Gaussian 204.

Moreover, the digital full path rendering system incorporates the point estimation 206 into determining the form of the second Gaussian 204. For example, the digital full path rendering system modifies the second Gaussian 204 to reflect the point estimation 206. In particular, the digital full path rendering system updates a coefficient of the second Gaussian 204 (e.g., covariance of the second Gaussian 204) based on the point estimation 206.

Figure 2C:
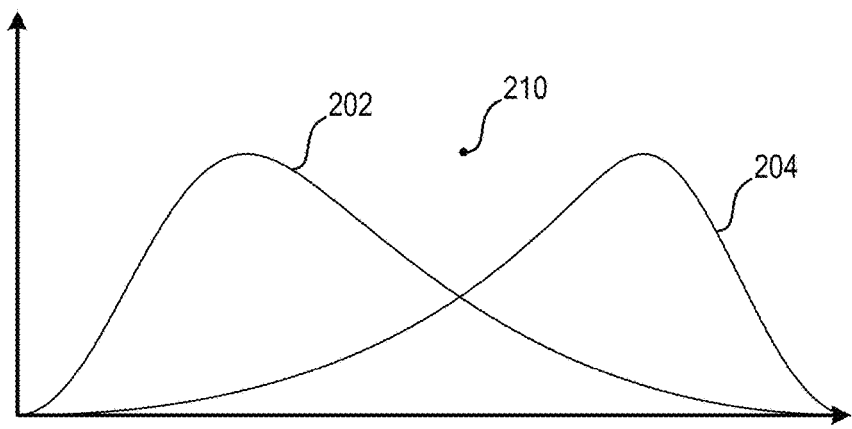

As mentioned, the digital full path rendering system can also apply a Dirichlet process to add Gaussian functions. For example, as shown in FIG. 2C, the digital full path rendering system analyzes a second point estimation 210 (i.e., a point estimation corresponding to a second sampled path). The digital full path rendering system determines a first probability that the second point estimation 210 corresponds to an existing Gaussian and a second probability that the second point estimation 210 corresponds to a new Gaussian. Because of the distance of the second point estimation 210 from the existing Gaussians, the digital full path rendering system determines that the second probability (i.e., the probability that the second point estimation 210 corresponds to a new Gaussian) is higher than the first probability (i.e., the probability that the second point estimation 210 corresponds to an existing Gaussian).

Figure 2D:
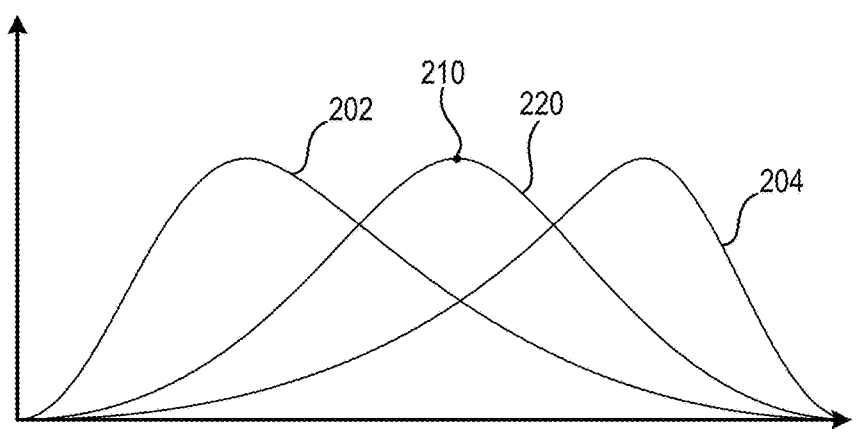

As shown, in FIG. 2D, based on the determination that the second probability is higher than the first probability, the digital full path rendering system adds a third Gaussian 220. In particular, the digital full path rendering system adds the third Gaussian 220 based on the location of the second point estimation 210.

It will be appreciated that, in one or more embodiments, the digital full path rendering system, the digital full path rendering system also moves a point estimation from one Gaussian function to another. In particular, the digital full path rendering system can determine a probability that a point estimation corresponds to a first existing Gaussian and a probability that a point estimation corresponds to a second existing Gaussian and move the point estimation based on a comparison of the probabilities. Indeed, in some circumstances, a Gaussian function becomes empty because its only sample is moved to another Gaussian. In such circumstances, the digital full path rendering system can also remove a Gaussian function.

In this manner, the digital full path rendering system generates a number of Gaussian functions. In particular, the digital full path rendering system iterates through existing sampled paths (and corresponding point estimations) and, for each sampled path, adds the sampled path to an existing Gaussian function or adds a new Gaussian function. After iterating through all sampled paths, the digital full path rendering system generates a number of Gaussian functions and determines the location and covariance of each Gaussian function based on the sampled paths assigned to the Gaussian function.

It will be appreciated that although FIGS. 2A-2D illustrate Gaussian functions along a single plane (e.g., a position charted against impact), the digital full path rendering system can determine Gaussians utilizing a similar approach in a variety of dimensions. For example, the digital full path rendering system can determine Gaussian functions having eight dimensions (e.g., corresponding to paths having four path segments).

Moreover, as described above, it will be appreciated that the digital full path rendering system can utilize the Gaussian functions 202, 204, and 220 in sampling additional paths. In particular, the digital full path rendering system utilizes the Gaussian functions 202, 204, and 220 as an initial estimate of a global light transport function to sample additional paths via a population Monte Carlo algorithm. Accordingly, in one or more embodiments, the digital full path rendering system utilizes a Dirichlet process for a robust initialization of a Gaussian mixture model in each iteration of population Monte Carlo sampling.

Figure 3:
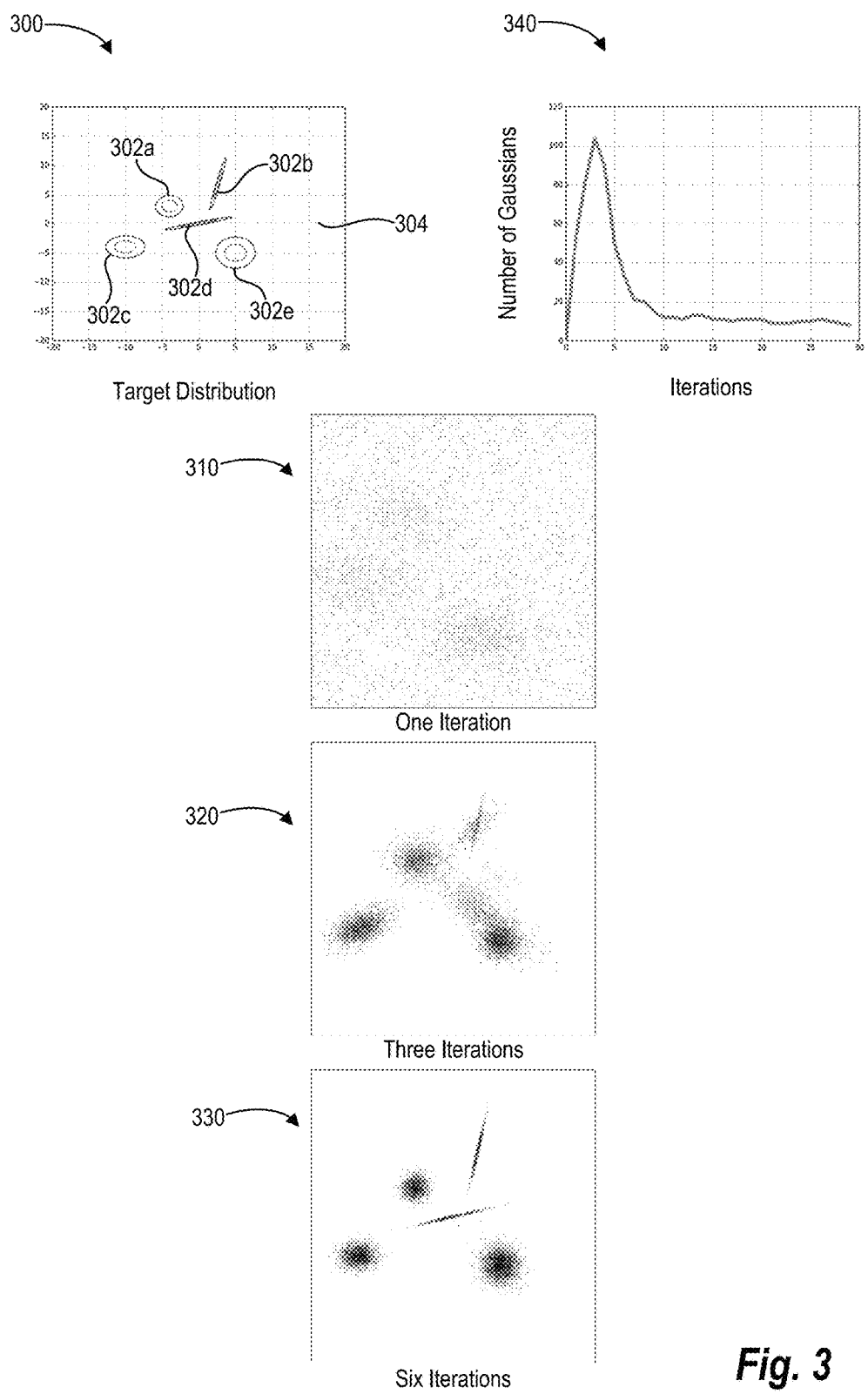
FIG. 3 illustrates iterative sampling of paths based on an updating approximation of a global light transport function in accordance with one or more embodiments.

Utilizing the Dirichlet process in combination with Gaussian mixture modeling, the digital full path rendering system can quickly model and sample a global light transport function in a virtual environment. For example, FIG. 3 illustrates the results of applying one or more embodiments of the digital full path rendering system within a virtual environment to iteratively approximate a global light transport function. In particular, FIG. 3 illustrates a target distribution 300 of light transport within a virtual environment 304 (i.e., the target distribution 300 with five regions 302a-302e within the virtual environment 304 of light transport between a light source and a camera perspective).

As shown in FIG. 3, the digital full path rendering system iteratively focuses in on the target distribution 300 utilizing one or more of the techniques described above. In particular, the digital full path rendering system samples paths, estimates a global light transport function (e.g., utilizing the Dirichlet process and Gaussian mixture model described above), samples additional paths, and repeats to further focus sampling on regions most likely to impact rendering of the digital image. For example, FIG. 3 illustrates a digital image 310 of sampled paths within the virtual environment 304 after one iteration (e.g., after sampling paths and a first estimate of the global light transport function). As the digital image 310 illustrates, the path sampling is broadly distributed across the virtual environment 304 with some focus on the regions 302a-302e of the target distribution 300.

As the number of iterations increases, the digital full path rendering system is able to quickly focus on the target distribution. In particular, FIG. 3 illustrates a digital image 320 of sampled paths after three iterations (i.e., three sets of path sampling and three estimations of the global light transport function). As shown, the sampled paths are more focused on the regions 302a-302e within the target distribution. In particular, the digital full path rendering system no longer samples broadly within the virtual environment 304, but targets regions with a higher likelihood to transport light from a light source to a camera perspective.

Moreover, FIG. 3 illustrates a digital image 330 of sampled paths after six iterations (e.g., six iterations of sampling paths and updating the estimate of the global light transport function). Notably, the sampled paths illustrated in digital image 330 are tightly focused on the target distribution 300. Accordingly, in six iterations, the digital full path rendering system iteratively focuses on the target distribution 300 so as to avoid wasted sampling of regions within the virtual environment 304 that are unlikely to contribute to rendering a digital image.

FIG. 3 also illustrates a graph 340 that reflects the number of Gaussian functions determined (e.g., via Dirichlet process) at each iteration. As shown, in the first few iterations (where the digital full path rendering system is beginning to focus on the targeted distribution 300, but still sampling broadly within the virtual environment) the number of Gaussians steadily rise. However, as the digital full path rendering system focuses more on the targeted distribution 300, the number of Gaussian functions begins to fall until reaching an equilibrium.

In this manner, the digital full path rendering system quickly and efficiently approximates a global light transport function in a relatively small number of iterations. Moreover, the digital full path rendering system utilizes the approximated global light transport function to efficiently focus path sampling within a virtual environment to reduce the amount of time and computing resources required to render a digital image.

As mentioned above, however, high dimensional path spaces can introduce unique problems into rendering virtual environments. Indeed, paths between a light source and a camera perspective with a large number of path segments (and a correspondingly high dimensionality) can be difficult to model and sample. For instance, high dimensionality models commonly fail as a result of under-sampling (i.e., inability to sample sufficiently along possible high-dimensional path segments to obtain sufficient information) and/or over-fitting (i.e., inaccurately focusing on errors or noise in the model instead of the underlying function because of high complexity). Moreover, high dimensional models often result in redundant fitting across dimensions, reducing the efficiency of estimating the global transport function and modeling samples that will contribute to clarifying features in the virtual environment.

In one or more embodiments, the digital full path rendering system simplifies the complexity of high-dimensional path spaces by combining Gaussian mixture models of different dimensions with multiple importance sampling techniques. Multiple importance sampling provides a means for combining multiple distributions. In particular, utilizing multiple importance sampling the digital full path rendering system can combine Gaussian mixture models having different dimensions (e.g., reflecting paths with different dimensions) using combination weightings.

This approach has a number of advantages. As an initial matter, combining different dimensional Gaussian mixture models improves efficiency by reducing redundancy in estimating the global transport function. In particular, by jointly fitting Gaussian mixture models of different dimensionality, the digital full path rendering system utilizes each model to emphasize features that are best reflected by a particular dimensionality. In particular, the digital full path rendering system automatically distributes Gaussian functions such that high dimensionality Gaussians focus on those features that are best reflected by high-dimensionality paths (while leaving other features for low-dimensional Gaussians).

Moreover, by distributing Gaussian mixture models, the digital full path rendering system significantly reduces the complexity of estimating the global light transport function. Indeed, because a large portion of full light paths can be expressed in terms of low dimensionality Gaussians functions, the digital full path rendering system models much of the global light transport function via the low dimensional Gaussian functions. The digital full path rendering system then utilizes high-dimensional Gaussian functions for those portions of the virtual environment best modeled with high-dimensionality Gaussian functions.

Figure 4A:
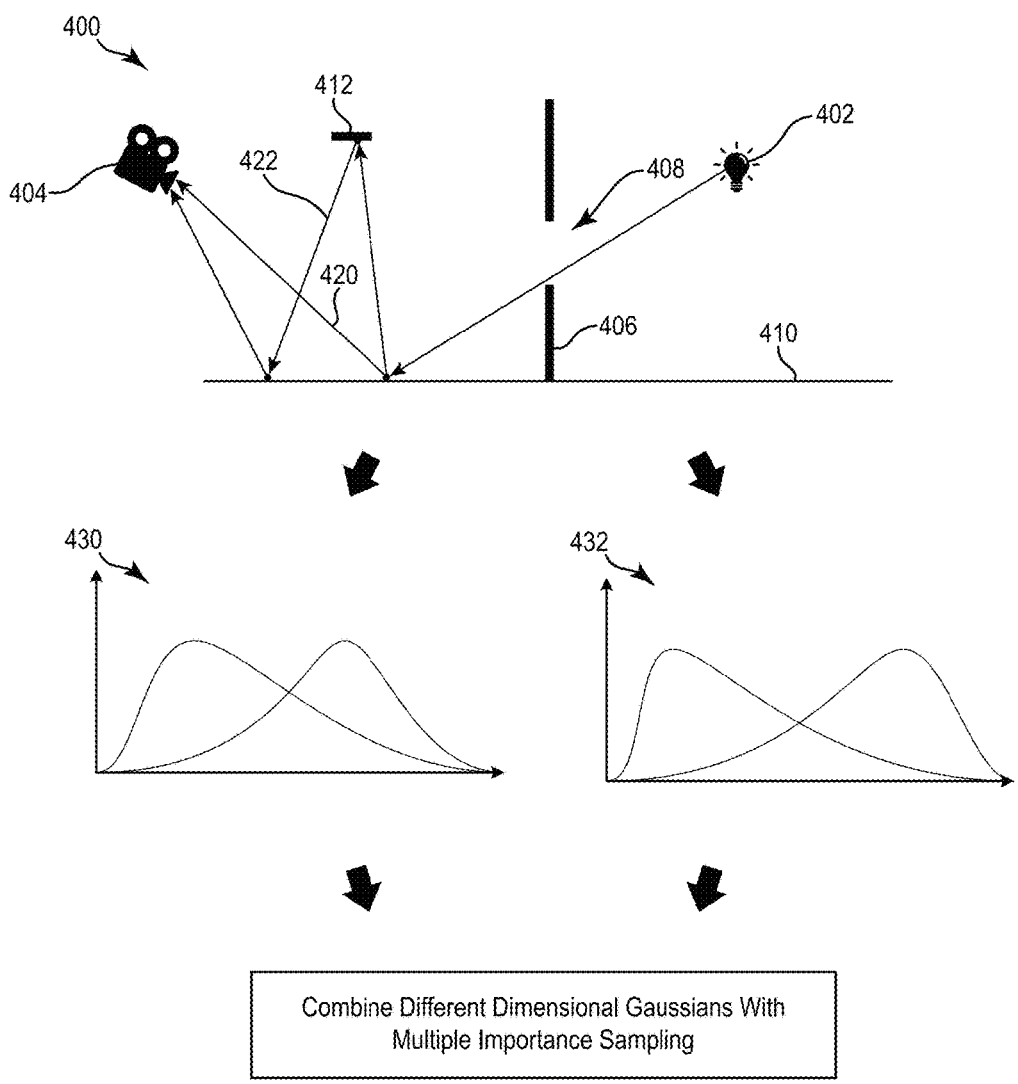
FIG. 4A illustrates a representation of sampling paths, generating Gaussian functions of different dimensions, and combining Gaussians of different dimensions utilizing multiple importance sampling in accordance with one or more embodiments.

For example, FIG. 4A illustrates a virtual environment 400 with a light source 402, a camera perspective 404, a barrier 406 (with a hole 408), a floor 410, and a ceiling 412. As shown, the digital full path rendering system samples paths with any number of dimensions (i.e., any number of path segments). For example, the digital full path rendering system estimates the global light transport function based on paths with two path segments (and four dimensions), such as the first path 420. Similarly, the digital full path rendering system estimates the global light transport function based on paths with four path segments (and eight dimensions), such as the second path 422. Furthermore, the digital full path rendering system estimates the global light transport function based on paths with any number of other path segments (e.g., twelve path segments having twenty-four dimensions).

As just discussed, the difficulty in estimating the global light transport function corresponding to the virtual environment 400 becomes exponentially more difficult at higher dimensionalities. Indeed, it is much easier, computationally, to estimate the global light transport function of the virtual environment 400 utilizing low-dimensionality path segments, such as the first path 420, rather than high-dimensionality path segments, such as the second path 422. However, some features of the virtual environment 400 may not be adequately reflected by paths with two segments. For example, paths with only two segments may not adequately reflect the ceiling 412 (because light cannot travel directly from the light source to the ceiling in a single path segment).

In order to adequately represent features of the virtual environment from high-dimensions while reducing the complexity modeling the global light path segment utilizing high-dimensional Gaussians, the digital full path rendering system utilizes multiple importance sampling. In particular, as shown in FIG. 4A, the digital full path rendering system combines a first plurality of Gaussians 430 reflecting low-dimensionality paths with a second plurality of Gaussians 432 reflecting high-dimensionality paths (e.g., utilizing multiple importance sampling). By combining and distributing the first plurality of Gaussians 430 with the second plurality of Gaussians 432, the digital full path rendering system simplifies the estimation of the global light transport function and subsequent sampling of the virtual environment.

Figure 4B:
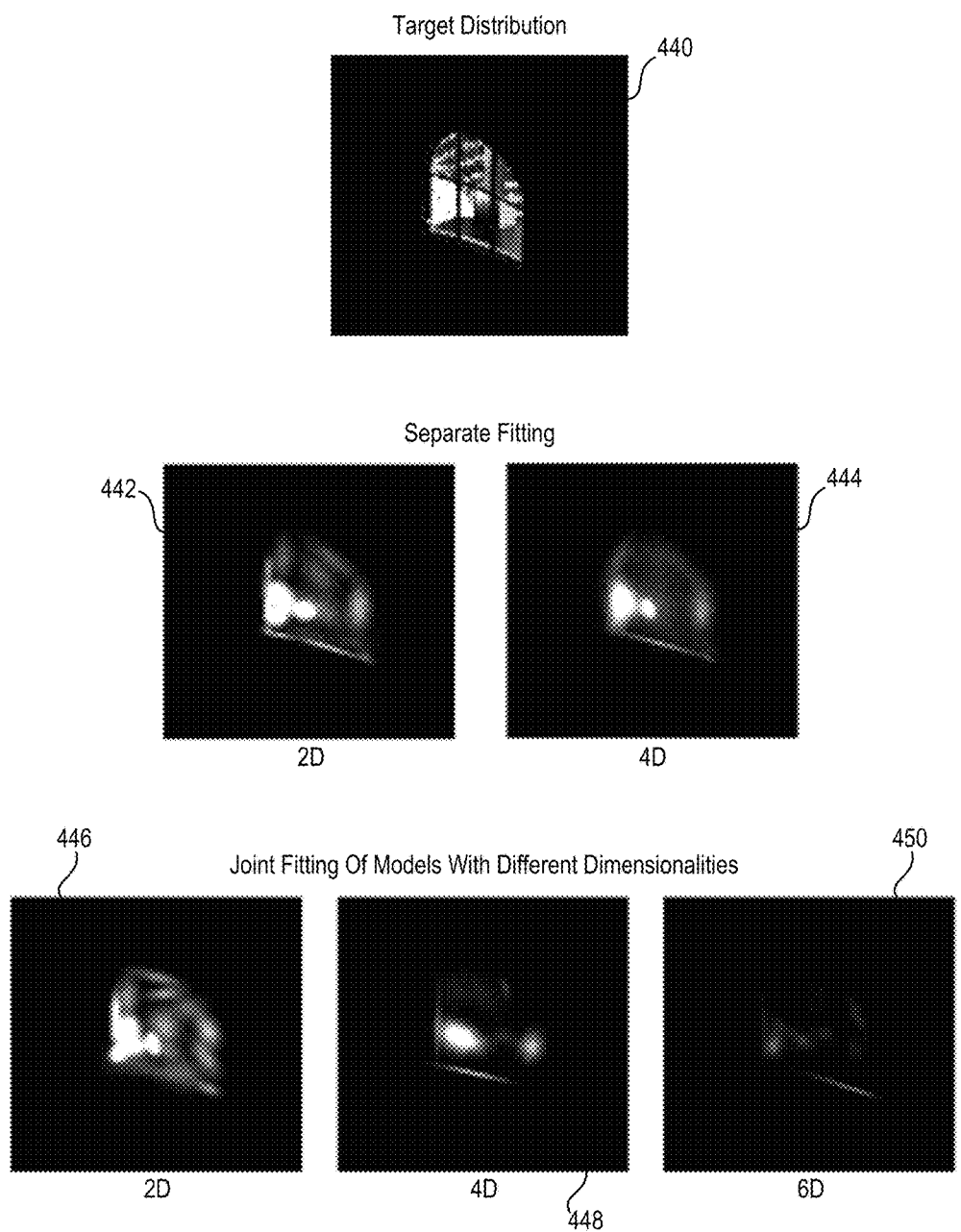
FIG. 4B illustrates a representation of separately fitting Gaussians of different dimensions and jointly fitting Gaussians of different dimensions utilizing multiple importance sampling in accordance with one or more embodiments.

To illustrate, FIG. 4B illustrates a representation of sampling a target distribution by separately fitting models with different dimensions and sampling a target distribution by jointly fitting models with different dimensions (e.g., utilizing multiple importance sampling). In particular, FIG. 4B illustrates a target distribution 440 (e.g., a representation of global light transport function of a virtual environment). FIG. 4B also illustrates an estimate 442 of the target distribution 440 utilizing two-dimensional Gaussian functions and an estimate 444 of the target distribution 440 utilizing four-dimensional Gaussian functions. As illustrated, the estimates 442 and 444 largely overlap, each reflecting similar features of the target distribution 440.

FIG. 4B also illustrates jointly fitted estimates of the target distribution 440. In particular, FIG. 4B illustrates a two-dimensional estimate 446, a four-dimensional estimate 448, and a six-dimensional estimate 450. Because the digital full path rendering system jointly fits the estimates 446-450 (using multiple importance sampling), information from Gaussians reflected in one dimension can be utilized across other dimensions. Accordingly, features of the target distribution 440 reflected in the two-dimensional estimate 446 need not be reproduced in the four-dimensional estimate 448 or the six-dimensional estimate 450.

Indeed, as illustrated, the four-dimensional estimate 448 focuses on features of the target distribution that are less pronounced in the two-dimensional estimate 446, and the six-dimensional estimate 450 includes minimal information regarding features not already included in the two-dimensional estimate 446 and the four-dimensional estimate 448. In this manner, the digital full path rendering system reduces the complexity of estimating a global light transport function with high-dimensional path spaces without sacrificing accuracy in rendering a digital image of the virtual environment.

In addition to multiple importance sampling, the digital full path rendering system can also increase the efficiency of rendering digital images by sampling from multiple directions in a virtual environment. Indeed, although the examples described in relation to the foregoing figures have illustrated sampling paths from a light source, it will be appreciated that in one or more embodiments, the digital full path rendering system also samples paths from other locations or directions. For example, in one or more embodiments, the digital full path rendering system samples paths from the camera perspective.

Figure 5A:
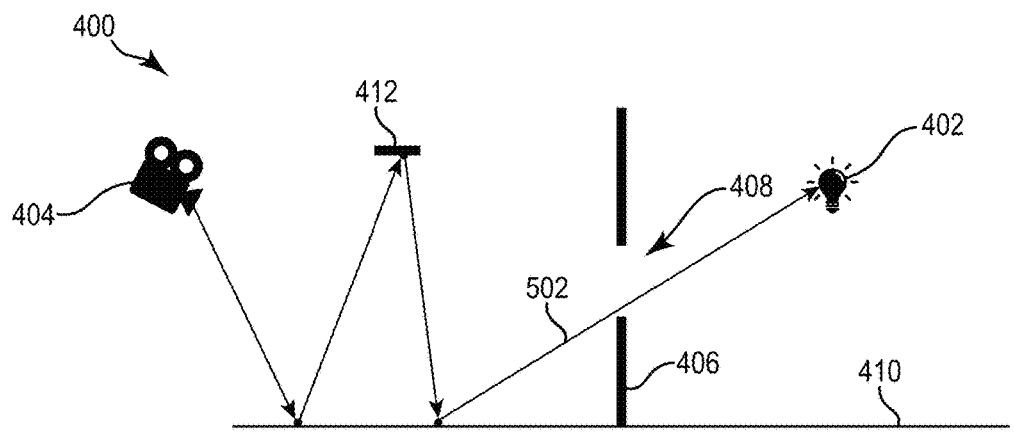
FIGS. 5A-5B illustrate bi-directional sampling utilizing multiple importance sampling in accordance with one or more embodiments.

Indeed, FIG. 5A illustrates the virtual environment 400 with the light source 402, the camera perspective 404, the barrier 406, the floor 410, and the ceiling 412. FIG. 5A shows that, in addition to sampling paths from the light source 402, the digital full path rendering system can also sample paths, such as a path 502, originating from the camera perspective 404.

Indeed, the digital full path rendering system can perform all the steps described above in relation to paths sampled from the camera perspective 404. For example, the digital full path rendering system samples paths from the camera perspective 404 (e.g., the path 502), determines point estimations of light transfer along the sampled paths, and utilizes the point estimations of light transfer to iteratively estimate a global light transport based on the paths sampled from the camera perspective 404. Moreover, the digital full path rendering system estimates a global light transport function from the camera perspective 404 based on a plurality of Gaussian functions (i.e., a Gaussian mixture model) where the number of Gaussian functions is established via statistical analysis of sampled paths from the camera perspective 404 (i.e., a Dirichlet process). Further the digital full path rendering system combines Gaussian functions based on sampled paths from the camera perspective having different dimensionalities by applying multiple importance techniques (as described above).

In sampling paths from a camera perspective, one or more embodiments of the digital full path rendering system trace initial path segments from within a digital image space. For example, because light rays must travel into the camera perspective (e.g., into a camera lens) in order to be included in a digital image, one or more embodiments of the digital full path rendering system only sample paths in directions captured by the camera perspective. Thus, for example, in relation to FIG. 5A the digital full path rendering system stratify the first path segment of all paths such that they emanate from the front of the camera perspective.

Moreover, in one or more embodiments, the digital full path rendering system samples paths from both a light source and a camera perspective. For example, the digital full path rendering system samples paths from a light source (and estimates a global light transport function based on the paths from the lights source) and samples paths from a camera perspective (and estimate the global light transport function based on the paths from the camera perspective). In such embodiments, the digital full path rendering system utilizes the estimated global light transport function based on the paths from the light source to sample additional paths from the lights source and utilizes the estimated global light transport function based on the paths from the camera perspective to sample additional paths from the camera perspective. Moreover, the digital full path rendering system utilizes the additional paths from the light source to update the estimated global light transport function based on the paths from the light source and utilizes the additional paths from the camera perspective to update the estimated global light transport function based on the paths from the camera perspective. In this manner, the digital full path rendering system utilizes sampled paths from multiple locations to sample and build estimates of the global light transport function.

In addition to sampling paths from a light source and sampling paths from a camera perspective, in one or more embodiments, the digital full path rendering system can also combine paths sampled from a light source and paths from a camera perspective. For example, in one or more embodiments, the digital full path rendering system estimates a global light transport function by combining paths from the camera perspective and the light source to build full light paths and/or determine point estimations of light transfer.

Figure 5B:
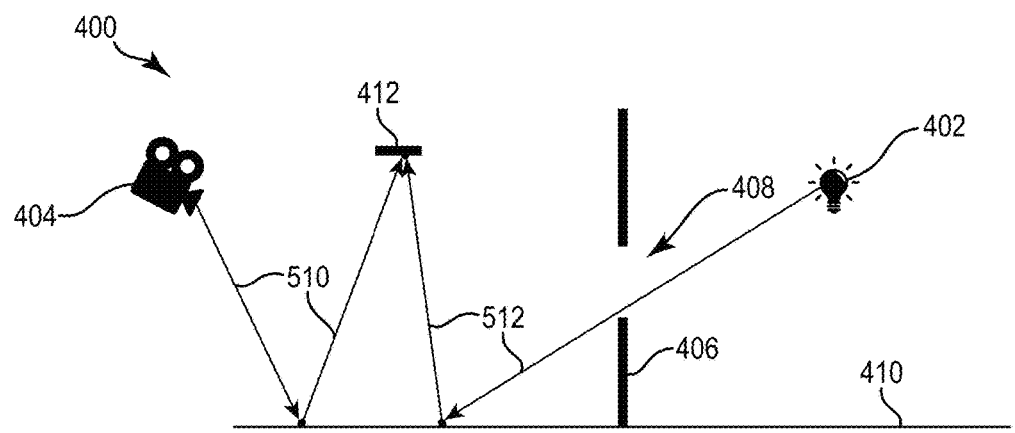

For example, FIG. 5B illustrates combining paths to generate full light paths in the virtual environment 400. As shown in FIG. 5B, the digital full path rendering system samples paths bi-directionally. In particular, the digital full path rendering system samples a path 510 from the camera perspective 404 and samples a path 512 from the light source 402 and combine the paths 510, 512 to form a full light path between the light source 402 and the camera perspective 404. Moreover, the digital full path rendering system determines a point estimation of light transfer along the paths 510, 512 based on the combined full light path.

Specifically, in one or more embodiments, the digital full path rendering system combines paths sampled from different locations (and/or different dimensionalities) by utilizing combination weighting (i.e., multiple importance sampling). In particular, the digital full path rendering system can apply connection and merging weightings to paths in determining the point estimation of light transfer of each path and in estimating the global light transport function.

This approach of bi-directional sampling (and combining sampled paths from both the light source 402 and the camera perspective 404) provides a number of advantages. For instance, this approach can further reduce the complexity (and dimensionality) of estimating the global light transport function. For example, rather than sampling the path 502 (or the path 422) with four path segments and eight dimensions, the digital full path rendering system can sample the paths 510 and 512, with two path segments and four dimensions.

In addition, bi-directional sampling can further increase the speed with which the digital full path rendering system estimates a global light transport function, focuses sampled paths on significant regions, and renders a digital image of the virtual environment. Indeed, by sampling both from the camera perspective and the light source, the digital full path rendering system can more easily and efficiently identify full light paths. Accordingly, bi-directional sampling (with multiple importance sampling techniques utilizing combination weightings) can further increase the speed of accurately rendering digital images of a virtual environment.

It will be appreciated that although FIG. 5B illustrates combining two paths of equal number of line segments, the digital full path rendering system can combine paths with a different number of line segments. Indeed, rather than combining the path 510 (having two path segments) and the path 512 (having two path segments), the digital full path rendering system can combine a path from the light source 402 having one path segment with a path from the camera perspective 404 having three path segments. Indeed, the digital full path rendering system can combine paths of any variety of combination of path segments (e.g., combine a path having three path segments together with a path having two path segments).

As mentioned previously, in one or more embodiments, the digital full path rendering system generates a digital image of a virtual environment based on sampled paths. Indeed, by identifying full light paths between a light source and a camera perspective in a virtual environment, the digital full path rendering system generates a digital image of the virtual environment. To illustrate, as described above, the digital full path rendering system determines an estimation of light transfer corresponding to full light paths between a light source and the camera perspective. The digital full path rendering system utilizes the estimated light transfer to determine a pixel (e.g., color, brightness, or luminosity) in a digital image representing the virtual environment from the camera perspective. Additional detail regarding how the foregoing is performed, in one or more embodiments, is included below.

In one or more embodiments, the digital full path rendering system, using the path integral framework, expresses the measurement of light transport (i.e., a global light transport function) as follows:

$$I = \int_{\Omega} f(x) d\mu(x)$$

where x lying in the domain $\Omega$ is a full light path connecting a light source and a camera perspective; and $f(x)$ and $\mu(x)$ are corresponding light transport throughput and the area-product measurement respectively. It is generally difficult to compute the foregoing equation (e.g., directly determine the global light transport function) for general scenarios; thus, in one or more embodiments a Monte Carlo strategy is used (e.g., as shown and discussed in relation to FIGS. 1A-1D). In one or more embodiments, the Monte Carlo strategy is composed of two parts. First, the digital full path rendering system samples a number of paths $\{x_i\}$ (e.g., the sampled paths 112a-112n) with probability density function p(x) (i.e., the uniform distribution 114). Second, the digital full path rendering system estimates the path integral (e.g., the estimated global light transport function 130) from the path samples:

$$I = E\left[\frac{1}{N}\sum_{i=1}^{N}\hat{I}(x_i)\right]$$

where N is the number of light path samples, $\hat{I}(x_i)$ is the estimate of a single light path $x_i$ (i.e., a point estimation of light transfer), and E[ ] is the operator of expectation. The efficiency of Monte Carlo methods are determined by the biases and variances introduced by $\hat{I}(x)$. Accordingly, in one or more embodiments, the digital full path rendering system employs the unbiased evaluation of $\hat{I}$.

$$\hat{I}(x_i) = \frac{f(x_i)}{p(x_i)}$$

The variance of the estimation $\hat{I}(x_i)$ is highly dependent on the properties of the sampling probability distribution function $p(x_i)$. Moreover, as a general matter, the probability distribution function is proportional to the throughput $p(x) \propto f(x)$, when $\hat{I}$ is a contant for all $x_i$. Although the throughput (i.e., amount of light transport via full light paths) is unknown before the path is sampled, the paths already generated can provide good guidance to sample new paths. Accordingly, one or more embodiments of the digital full path rendering system utilize large collections of samples (e.g., the sampled paths 112a-112n, 132a-132n) via population Monte Carlo sampling techniques to actively build and refine the probability distribution function $p(x)$ (e.g., the estimated global light transport function 130), which is represented by a plurality of Gaussian functions via a Gaussian mixture model (e.g., the Gaussian function 140 or the plurality of Gaussians discussed in relation to FIG. 1D and FIG. 3).

As mentioned above, a path can be generated by unidirectional tracing (such as tracing from the light source or from the camera perspective as shown in FIGS. 1C and 5A). Alternatively, a light path can be generated by connecting two paths traced from light source and camera perspective separately (e.g., as shown in FIG. 5B). In one or more embodiments, the probability distribution function $p(x)$ is refined according to the throughput of full light paths even as it is used for path tracing.

Accordingly, in one or more embodiments, the digital full path rendering system extends population Monte Carlo to full path space and the path sampling probability distribution function $p(x)$ (i.e., the estimated global light transport function) is represented by a Gaussian mixture model computed according to the throughput of large collections of full light paths. Moreover, the digital full path rendering system introduces a Dirichlet process (e.g., as illustrated in FIGS. 2A-2D) for a robust initialization of a Gaussian mixture model (i.e., the initial number, positions and variances of Gaussians are determined by Dirichlet process). Moreover, the Gaussian mixture model is progressively refined for better efficiency of computation and storage.

For example, in one or more embodiments, a full light path x is generated by connecting or merging a light path $x_s$ (i.e., a light path originating from the light source) and a camera path $x_t$, where s and t are the number of vertices. The importance for a given $x_s$ is an integral on all possible x which contain $x_s$, according to the following:

$$I(x_s) = \int_{x \succ x_s} f(x) d\mu(x)$$

where $x \succ x_s$ means $x_s$ is a part of x. In one or more embodiments, the digital full path rendering system seeks to generate a path generation probability distribution function proportional to path importance, $p(x) \propto f(x)$ (i.e., the digital full path rendering system seeks to estimate the global light transport function).

Accordingly, in one or more embodiments, the digital full path rendering system employs a population Monte Carlo approach for adaptive importance sampling. In one or more embodiments, the population distribution function is started with a simple form, such as uniform distribution. In every iteration, the digital full path rendering system generates a new batch of samples with the probability distribution function (i.e., the estimate of the global light transport function) provided by the previous iteration. The probability distribution function (i.e., the estimate of the global light transport function) is updated according to the throughput of the samples. Therefore, the sample probability distribution function p is progressively refined to be more proportional to the function $f$ (i.e., the estimate becomes more accurately aligned to the actual global light transport function).

In one or more embodiments, the digital full path rendering system represents the probability distribution function with a Gaussian mixture model as follows:

$$p^i(r_s) = \sum_{k=1}^{K^i} g_k^i(r_s)$$

$$g_k^i(r_s) = a_k^i \mathcal{N}_k^i(r_s)$$

where $\mathcal{N}_k^i$ is a Gaussian with mean $\mu_k^i$ and covariance $\Sigma_k^i$, i is the index of iteration, k is the index of Gaussian, $K^i$ is the number of Gaussians in iteration i, and $\alpha_k^i$ is the convex combination weights for iteration i. Here $r_s$ is a re-parameterization of $x_s$ with the random numbers used for its tracing. For example, a path from a light source with s=3, 6 random numbers are used because of the spatial sampling of $x_{s,0}$, and direction sampling of $x_{s,0} \to x_{s,1}$ and $x_{s,1} \to x_{s,2}$, where $x_{s,i}$ is the i-th vertex on $x_s$. With this parameterization, the function for $I(x_s)$ above is scaled by the determinant of the Jacobian matrix between $x_s$ and $r_s$:

$$I(r_s) = I(x_s) \left\| \frac{\partial x_s}{\partial r_s} \right\|$$

Because of the difficult of accurately evaluating $I(r_s)$, one or more embodiments utilize Monte Carlo Estimation $\hat{I}(r_s)$ instead, which is achieved with algorithms like united path sampling and vertex connection and merging.

In one or more embodiments, the digital full path rendering system starts with a simple setup for the population Monte Carlo. In particular, the digital full path rendering system assumes $p^0$ is a probability distribution function of uniform distribution, $K^i$ is a constant K for all iterations, and randomly generate $\alpha_k^0$, $\mu_k^0$, and $\Sigma_k^0$. Then the digital full path rendering system iteratively updates p with an expectation maximization procedure. In particular, for iteration i, the digital full path rendering system generates N samples $\{r_{s,j}\}$ according to $p^{i-1}$, and utilizes their estimation $\{\hat{I}(r_{s,j})\}$ to compute $p^i$:

$$a_k^i = \sum_{j=1}^{N} \overline{w}_j \rho_{j,k}$$

$$\mu_k^i = \frac{\sum_{j=1}^{N} \overline{w}_j \rho_{j,k} r_{s,j}}{a_k^i}$$

$$\sum_k \frac{\sum_{j=1}^{N} \overline{w}_j \rho_{j,k}(r_{s,j} - \mu_k^i)(r_{s,j} - \mu_k^i)^T}{a_k^i}$$

where $w_j$ is the normalized importance weight of $r_{s,j}$ in $p^{i-1}$ $$\overline{w}_j = \frac{w_j}{\sum_{m=1}^{N} w_m}$$

$$w_m = \frac{\hat{I}(r_{s,m})}{p^{i-1}(r_{s,m})}$$

and $\rho_{j,k}$ is the weight of $g_k^{i-1}$ in $p^{i-1}$ for $r_{s,j}$ $$\rho_{j,k} = \frac{g_k^{i-1}(r_{s,j})}{p^{i-1}(r_{s,j})}$$

As mentioned above, in every iteration of the population Monte Carlo, the quality of $p^i$ is highly dependent on $p^{i-1}$. The expectation maximization procedure algorithm may fail with a poor $p^0$. Accordingly, it is challenging to find an optimal K, which varies significantly with different scene scenarios. Therefore, one or more embodiments of the digital full path rendering system utilize a Dirichlet process (e.g., as illustrated in relation to FIGS. 2A-2D) in to generate a better initialization of Gaussian mixture model $\hat{p}^i$, which is achieved by the samples $\{r_{s,j}\}$ drawn from $p^{i-1}$. The digital full path rendering system updates $p^i$ from $\hat{p}^i$ instead of $p^{i-1}$ for higher accuracy and robustness, with the same expectation maximization scheme discussed above.

In one or more embodiments, the digital full path rendering system includes each sample in only one Gaussian. In one or more embodiments, the digital full path rendering system sequentially iterates over the samples to decide whether each of the samples should be switched to a different Gaussian. The probability distribution function achieved by the d-th iteration in the sampling process as denoted $\hat{p}^{i,d}$, which is composed of $K^{i,d}$ Gaussian components $\{\hat{g}_k^{i,d}\}$. During the d-th iteration, $c_k^{i,d}$ is the accumulated estimation of all samples included in $\hat{g}_k^{i,d-1}$ $$c_k^{i,d} = \sum_{r_{s,j} \in \hat{g}_k^{i,d-1}, j \neq d} \hat{I}(r_{s,j})$$

where $r_{s,j}$ is excluded as it is processed in this iteration. For the first iteration of sampling, the digital full path rendering system can assume $\hat{p}^{i,0} = p^{i-1}$, and $r_{s,j} \in \hat{g}_k^{i,0}$ if $r_{s,j}$ is sampled from $g_k^{i-1}$. As described above in relation to FIGS. 2A-2D, the digital full path rendering system can assign the sample $r_{s,d}$ to an existing Gaussian or propose a new Gaussian separately with the probability $$\overline{q}_k^{i,d} = \begin{cases} \frac{q_k^{i,d}}{\alpha + \sum_{m=1}^{K^{i,d-1}} q_m^{i,d}} & \text{if } k \leq K^{i,d-1} \\ \frac{\alpha}{\alpha + \sum_{m=1}^{K^{i,d-1}} q_m^{i,d}} & \text{if } k = K^{i,d-1} + 1 \end{cases}$$

$$q_k^{i,d} = c_k^{i,d} \left(\hat{\mathcal{N}}_k^{i,d}(r_{s,d})\right)^{\hat{I}(r_{s,d})}$$

where $\hat{\mathcal{N}}_k^{i,d}$ is the unweighted Gaussian in $\hat{g}_k^{i,d}$. If $k = K^{i,d-1} + 1$, a new Gaussian is proposed and $r_{s,j}$ is assigned to the new Gaussian.

In a conventional Dirichlet process, the proposed Gaussian should be sampled from base distribution. In one or more embodiments, the digital full path rendering system places the Gaussian at $r_{s,d}$ and computes its covariance from all samples. It is possible a Gaussian becomes empty because its only sample $r_{s,d}$ is moved to a new Gaussian. In such circumstances, the empty Gaussian is removed. In general, there are possibly three differences between $\hat{p}^{i,d-1}$ and $\hat{p}^{i,d}$: assign $r_{s,d}$ to a different Gaussian, propose a new Gaussian, or remove an empty Gaussian. After iterating all samples, $\hat{p}^{i,N}$ is assigned to $\hat{p}^i$ with the coefficient of every Gaussian updated by the sample count $$\hat{a}^i = \frac{c_k^i}{\sum_{m=1}^{\hat{K}^i} c_m^i}$$

$$c_k^i = \sum_{r_{s,j} \in \hat{g}_k^{i,d}} \hat{I}(r_{s,j})$$

where $\hat{K}^i = \hat{K}^{i,N}$ is the number of Gaussians in $\hat{p}^i$.

Accordingly, one or more embodiments the digital full path rendering system utilizes both population Monte Carlo and Dirichlet process. That said, there are at least three differences from utilization of a conventional Dirichlet process in other contexts. After iterating over all samples, conventional utilization of Dirichlet process has to update the base distribution and sample accordingly if necessary. The digital full path rendering system utilizes, in one or more embodiments, an expectation maximization scheme instead without explicit base distribution sampling. The samples of every iteration contribute to the final rendering result. Therefore, the variance of base distribution sampling will downgrade with rendering quality.

In conventional Dirichlet process, the proposed Gaussian should be sampled according to the base distribution. The digital full path rendering system places the Gaussian at the sample. The digital full path rendering system computes the covariance from all samples, which is a conservative solution to prevent over-fitting.

Moreover, the conventional Dirichlet process is generally a counting scheme, which means $\hat{I}$ is constantly 1. In relation to the digital full path rendering system, $\hat{I}$ is a light transport intensity, and it is a Monte Carlo estimate instead of an accurate evaluation.

As mentioned above, in one or more embodiments, the digital full path rendering system traces paths from light source and camera perspective and the lengths of paths can be very different. Accordingly, one or more embodiments of the digital full path rendering system utilize a unified scheme to handle all paths.

However, as mentioned above, when s is a large number, $r_s$ will become a very high dimensional vector. For the curse of dimensionality, the digital full path rendering system can fail for under-sampling or over-fitting. To maintain good quality, a huge number of samples would need to be generated for a single iteration.

However, as mentioned above, a full light path can be generated by paths with different depths (i.e., dimensions). All of them can contribute to the final result with convex combination weights. This is known as multiple importance sampling. In the framework of united path sampling and vertex connection and merging, the Monte Carle estimate, $\hat{I}(x_s)$, can be expanded with multiple importance sampling weights, as follows:

$$\hat{I}(x_i) = \sum_{s+t-1=l} \frac{\omega^c_{s,t}(x_i)f(x_i)}{p(x_s)p(x_t)} + \sum_{s+t-2=l} \frac{\omega^m_{s,t}(x_i)f(x_i)}{p(x_s)p(x_t)p^m(x_s,x_t)}$$

where l is the length of the full light path $x_l$, $p^m(x_s, x_t)$ is the probability to merge between $x_s$ and $x_t$, $\omega^c_{s,t}$ and $\omega^m_{s,t}$ are the weights of connection and merging respectively. The importance of a path, $I(x_s)$, is changed by introducing multiple importance sampling weight, as follows:

$$I^{mis}(x_s) = \int_{x \succ x_s} (\omega_{s,l_x-s+1}{}^c + \omega_{s,l_x+2-s}{}^m) f(x) d\mu(x)$$

where $l_x$ is the length of x.

In this framework, and as discussed above, multiple importance sampling can be taken as an implicit light transport separation among different dimensions, as a certain part of throughput may be with non-trivial weights only for one or two dimensionalities. Consequently, $I^{mis}(x_s)$ is a much simpler function than $I(x_s)$, and the high dimensional challenge is substantially alleviated.

In one or more embodiments, a joint scheme of all dimensionalities is used to automatically distribute Gaussians between them. For example, in one or more embodiments, the digital full path rendering system supports s∈[2, 5]. Moreover, in one or more embodiments, the low dimensional Gaussians are aligned to high dimensional Gaussians by extending the rest dimensionalities with uniform distribution. For new Gaussian proposal in Dirichlet process, its dimensionality is uniformly sampled from [2,5]. Besides the Gaussians with different dimensionalities, the digital full path rendering system can also include a uniform distribution component $p_\mu(x_s)$. To hold the ergodicity, $p_\mu(x_s)$ can be assigned with a user defined minimal value if its sampling count is too small.

As mentioned, the digital full path rendering system can be applied to light paths and camera paths. This is because the Gaussian mixture model representation can provide analytical evaluation of probability distribution functions while sampling paths, which is impossible with Markov Chain Monte Carlo methods like Metropolis-Hasting algorithm.

Unlike paths from a light source, in one or more embodiments, the first segment of paths from a camera perspective are stratified throughout the image space. Accordingly, the digital full path rendering system can generate $p(r_t)$ without considering the stratification. The digital full path rendering system can trace paths from the camera perspective accordingly, the random number of primary rays tracing $r_{t_1}{}^2$ are generated with uniform stratified sampling in image space, and the rest random $r_{t_i}$ numbers are sampled with corresponding conditional probability function $p(r_t)|r_{t_i}{}^2$. Here $r_{t_i}{}^j$ represents the portion of path $r_t$ starting from the i-th vertex to the j-th vertex.

Thus, in one or more embodiments the digital full path rendering system utilizes the following pseudo code from Algorithm 1 to render a digital image of a virtual environment utilizing full path space learning:

---
Algorithm 1

Set $p^0(x_s)$ and $p^0(x_t)$ as uniform distributions
for iteration I do
    Sample light sub-paths $\{x_s\} \sim p^{i-1}(x_s)$
    Sample camera sub-paths $\{x_{t_i}{}^2\}$:
        $x_{t_i}{}^2$ is stratified in image space
        $x_{t_i}{}^i \sim p^{i-1}(x_t)|x_{t_i}{}^2$
    Render with $\{x_s\}$ and $\{x_t\}$, and to the result image
    Compute $\hat{p}^i(x_s)$ and $\hat{p}^i(x_t)$
    Compute $p^i(x_s)$ and $p^i(x_t)$
end for

---

Figure 6:
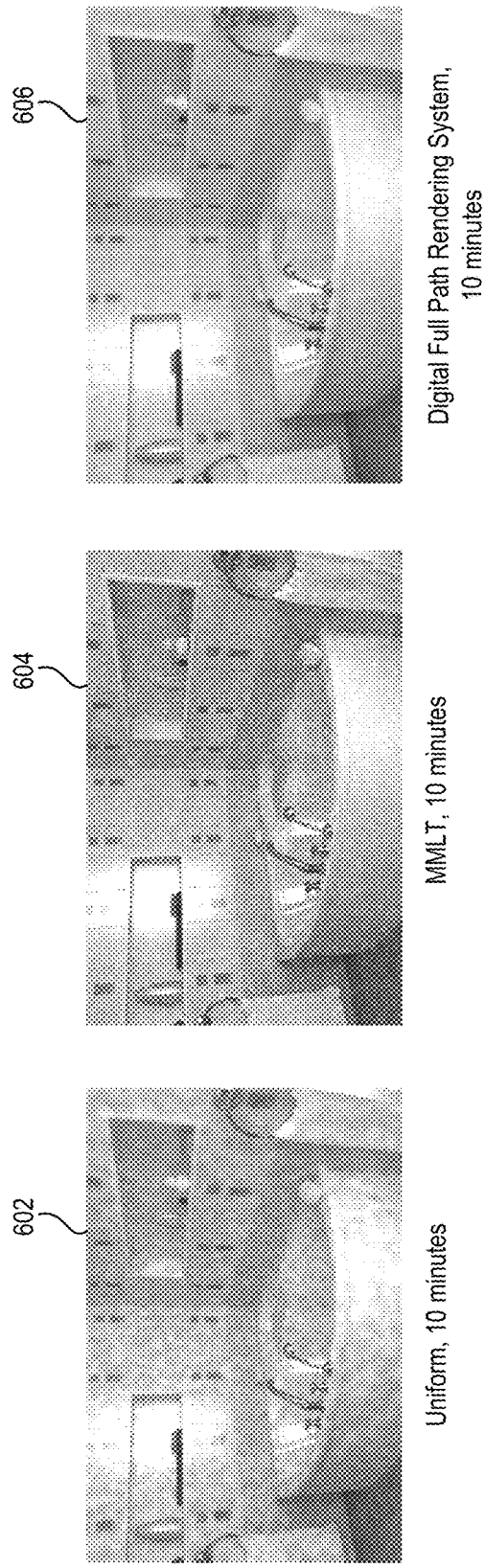
FIG. 6 illustrates a digital image of a virtual environment rendered in accordance with one or more embodiments as compared to digital images rendered utilizing other techniques.

As mentioned above, the digital full path rendering system can significantly improve the time required to produce accurate, unbiased digital images of a virtual environment. For example, FIG. 6 illustrates a digital image of a virtual environment produced utilizing one embodiment of the digital full path rendering system. In addition, FIG. 6 illustrates digital images of a virtual environment generated utilizing other conventional techniques.

Specifically, FIG. 6 shows a first digital image 602 that illustrates a rendering of a virtual environment utilizing a conventional uniform sampling technique after ten minutes of operation. Moreover, FIG. 6 includes a second digital image 604 that illustrates a rendering of a virtual environment utilizing a Multiplexed Metropolis Light Transport sampling scheme (e.g., a sequential vertex sampling scheme) after ten minutes of operation. Similarly, FIG. 6 includes a third digital image 606 that illustrates a rendering of a virtual environment utilizing one embodiments of the digital full path rendering system after ten minutes.

As shown, the digital images 602 and 604 suffer from sparkle artifacts and noise. In particular, the digital images 602 and 604 have had insufficient time to resolve variance and generate a high-quality digital image of the virtual environment. In contrast, the third digital image 606 provides a near photo-realistic digital rendering of the virtual environment with minimal artifacts. Accordingly, FIG. 6 shows that the digital full path rendering system provides accurate, unbiased digital images of a virtual environment in significantly shorter time than conventional systems. Indeed, to obtain similar quality, the uniform sampling technique would require over ten hours of computation.

Figure 7:
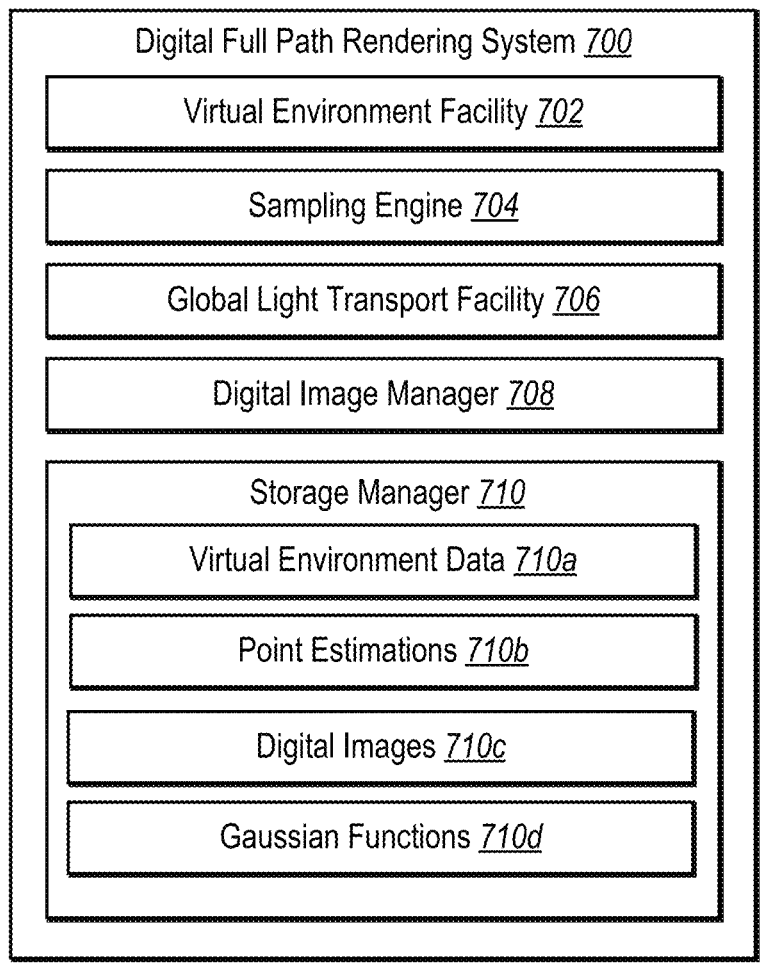
FIG. 7 illustrates a schematic diagram illustrating a digital full path rendering system in accordance with one or more embodiments.

Turning now to FIG. 7, additional detail is provided regarding components and capabilities of one embodiment of the digital full path rendering system. In particular, FIG. 7 illustrates an embodiment of an exemplary digital full path rendering system 700 (e.g., the digital full path rendering system referenced above). As shown, the digital full path rendering system 700 may include, but is not limited to a virtual environment facility 702, a sampling engine 704, a global light transport facility 706, a digital image manager 708, and a storage manager 710 (comprising virtual environment data 710a, point estimations 710b, digital images 710c, and Gaussian functions 710d).

As just mentioned, and as illustrated in FIG. 7, the digital full path rendering system 700 may include the virtual environment facility 702. The virtual environment facility 702 can identify, analyze, generate, calculate, provide, and manage one or more virtual environments. In particular, virtual environment facility 702 can generate geometric boundaries within a virtual environment (e.g., occlusions, walls, or floors), surfaces (e.g., surfaces with particular material properties), light sources, and/or camera perspectives. For example, the virtual environment facility 702 can utilize user input to generate a virtual environment (e.g., user input of a location or direction of camera perspective; user input of a light source location, direction, or type; or user input of a surface or object in the virtual environment).

As shown in FIG. 7, the digital full path rendering system 700 also includes the sampling engine 704. The sampling engine 704 can generate, cast, create, and/or sample paths within a virtual environment. In particular, the sampling engine 704 can generate a plurality of paths having a variety of path segments within a virtual environment. As described above, the sampling engine 704 can generate samples from a light source and/or a camera perspective. Moreover, the sampling engine 704 can combine sampled paths (e.g., paths sampled from a light source and paths sampled from a camera perspective).

In addition, the sampling engine 704 can also calculate, identify, determine, and/or generate point estimations of light transfer corresponding to sampled paths. For instance, the sampling engine 704 can determine a measure of importance of a path in relation to light transfer along full light paths from a light source to a camera perspective in a virtual environment.

As described above, the sampling engine 704 can generate paths based on a variety of distributions (e.g., uniform distribution or non-uniform distribution). In particular, the sampling engine 704 can sample paths based on an estimate of a global light transport function (e.g., a plurality of Gaussian functions that estimate a probability distribution function). Moreover, the sampling engine 704 can iteratively sample additional paths based on updated estimates of the global light transport function.

As illustrated in FIG. 7, the digital full path rendering system 700 also includes the global light transport facility 706. In particular, the global light transport facility 706 can approximate, estimate, calculate, determine, or model light transport within a virtual environment. In particular, the global light transport facility 706 can approximate a global light transport function.

For example, the global light transport facility 706 can estimate a global light transport function based on sampled paths within a virtual environment (e.g., paths from the sampling engine 704). In particular, the global light transport facility 706 can estimate a global light transport function based on point estimations of light transfer from sampled paths. Moreover, the global light transport facility 706 can iteratively update an estimated global light transport function based on additional sampled paths.

As described above, the global light transport facility 706 can utilize a variety of approaches to efficiently estimate a global light transport function with fewer iterations and samples. For example, the global light transport facility 706 van utilize a plurality of Gaussian functions to generate a Gaussian mixture model estimation of a global light transport function. Moreover, the global light transport facility 706 can utilize a statistical Dirichlet process to more accurately estimate initial Gaussians for utilization in the Gaussian mixture model. Further, the global light transport facility 706 can utilize complex combination weightings to combine sampled paths (and/or Gaussian functions) of different dimensionality.

In addition to the global light transport facility 706, as illustrated in FIG. 7, the digital full path rendering system 700 also includes the digital image manager 708. The digital image manager 708 can create, render, generate, and/or provide digital images of a virtual environment. In particular, the digital full path rendering system can utilize sampled paths (e.g., via the sampling engine 704) to render a digital image of a virtual environment from a camera perspective. To illustrate, the digital image manager 708 can determine measures of light (e.g., energy, intensity, etc.) along full light paths between a light source and a camera perspective and utilize the measures of light to render a digital image of the virtual environment.

Moreover, as illustrated in FIG. 7, the digital full path rendering system 700 also includes the storage manager 710. The storage manager 710 maintains data to perform the functions of the digital full path rendering system 700. As illustrated, the storage manager 710 includes virtual environment data 710a (e.g., material information, geo-spacial information, light source information, camera perspective information, or other information regarding the virtual environment), point estimations 710b (e.g., point estimations of light transfer and/or sampled paths), digital images 710c (e.g., digital images of a virtual environment rendered by the digital full path rendering system 700), and Gaussian functions 710d (e.g., Gaussian functions utilized to estimate a global light transport function).

Each of the components 702-710 of the digital full path rendering system 700 (as shown in FIG. 7) may be in communication with one another using any suitable communication technologies. It will be recognized that although components 702-710 of the digital full path rendering system 700 are shown to be separate in FIG. 7, any of components 702-710 may be combined into fewer components, such as into a single facility or module, divided into more components, or configured into different components as may serve a particular embodiment.

The components 702-710 of the digital full path rendering system 700 can comprise software, hardware, or both. For example, the components 702-710 can comprise one or more instructions stored on a computer-readable storage medium and executable by processors of one or more computing devices. When executed by the one or more processors, the computer-executable instructions of the digital full path rendering system 700 can cause a client device and/or a server device to perform the methods described herein. Alternatively, the components 702-710 and their corresponding elements can comprise hardware, such as a special purpose processing device to perform a certain function or group of functions. Additionally, the components 702-710 can comprise a combination of computer-executable instructions and hardware.

Furthermore, the components 702-710 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-710 may be implemented as a stand-alone application, such as a desktop or mobile application. Furthermore, the components 702-710 may be implemented as one or more web-based applications hosted on a remote server. The components 702-710 may also be implemented in a suit of mobile device applications or "apps." To illustrate, the components 702-710 may be implemented in an application, including but not limited to ADOBE PHOTOSHOP software or ADOBE LIGHTROOM software.

"ADOBE," "PHOTOSHOP," and "LIGHTROOM" are either registered trademarks or trademarks of Adobe Systems Incorporated in the United States and/or other countries.

Figure 8:
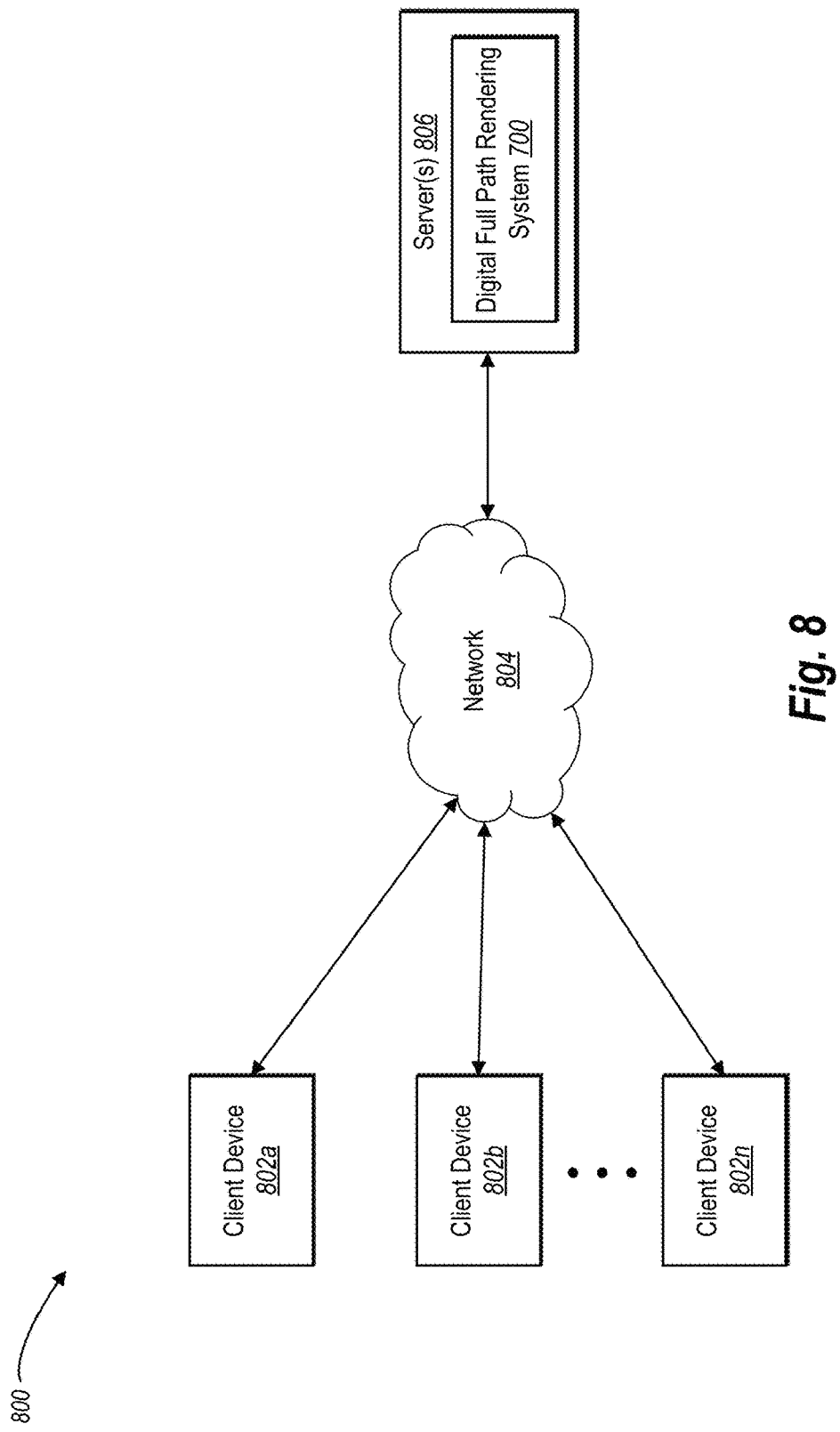
FIG. 8 illustrates a schematic diagram illustrating an exemplary environment in which the digital full path rendering system may be implemented in accordance with one or more embodiments.

FIG. 8 illustrates a schematic diagram of one embodiment of an exemplary environment 800 in which the digital full path rendering system 700 can operate. In one or more embodiments, the exemplary environment 800 includes one or more client devices 802a, 802b, . . . 802n, a network 804, and server(s) 806. The network 804 may be any suitable network over which the computing devices can communicate. Example networks are discussed in more detail below with regard to FIG. 11.

As illustrated in FIG. 8, the environment 800 may include client devices 802a-802n. The client devices 802a-802n may comprise any computing device. For instance, in one or more embodiments, one or more of the client devices 802a-802n comprise one or more computing devices described below in relation to FIG. 11.

In addition, the environment 800 may also include the server(s) 806. The server(s) 806 may generate, store, receive, and transmit any type of data, including virtual environment data 710a, point estimations 710b, digital images 710c, and/or Gaussian functions 710d. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server. Additional details regarding the server(s) 806 will be discussed below with respect to FIG. 11.

As illustrated, in one or more embodiments, the server(s) 806 can include all, or a portion of, the digital full path rendering system 700. In particular, the digital full path rendering system 700 can comprise an application running on the server(s) 806 or a portion of a software application that can be downloaded from the server(s) 806. For example, the digital full path rendering system 700 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, and the server(s) 806, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the digital full path rendering system 700 can be implemented on a single computing device. In particular, the digital full path rendering system 700 may be implemented in whole by the client device 802a or the digital full path rendering system 700 may be implemented in whole by the server(s) 806. Alternatively, the digital full path rendering system 700 may be implemented across multiple devices or components (e.g., utilizing the client devices 802a-802n and the server(s) 806).

By way of example, in one or more embodiments, the client device 802a can send a request to the server(s) 806 to obtain a digital image of a virtual environment from a particular camera perspective. The server(s) 806 can provide access to one or more virtual environments stored on the server(s) 806 (e.g., via the storage manager 710 and the virtual environment facility 702) to the client device 802a. Moreover, the server(s) 806 can sample a plurality of paths from a light source within the virtual environment (e.g., via the sampling engine 704), iteratively refine an estimated global light transport function (e.g., via the global light transport facility 706), and iteratively sample additional paths to render a digital image of the virtual environment from the camera perspective(e.g., via the digital image manager 708). The server(s) 806 can also provide the digital image of the virtual environment to the client device 802a.

Figure 9:
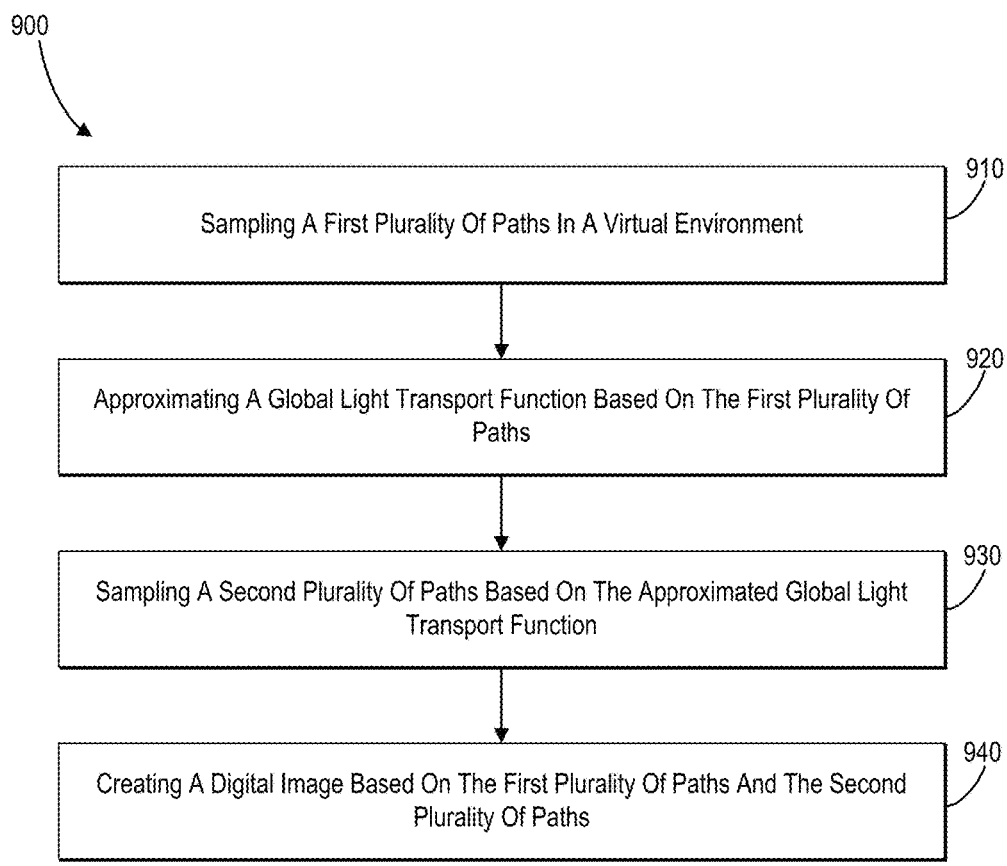
FIG. 9 illustrates a flowchart of a series of acts in a method of rendering a digital image of a virtual environment utilizing full path learning in accordance with one or more embodiments.
Figure 10:
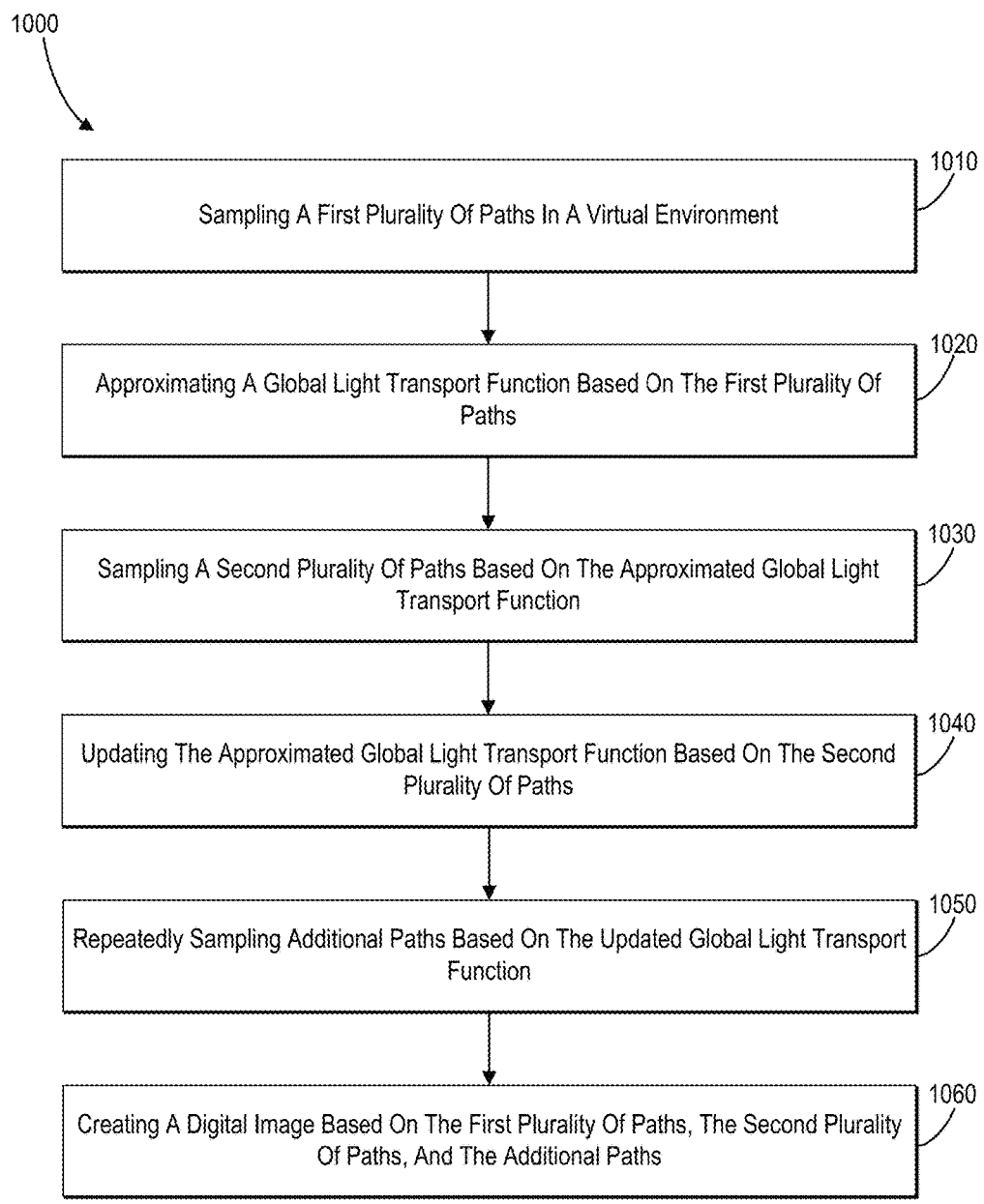
FIG. 10 illustrates a flowchart of a series of acts in a method of rendering a digital image of a virtual environment utilizing full path learning in accordance with one or more embodiments.

FIGS. 1A-8, the corresponding text, and the examples, provide a number of different systems and devices for rendering digital images of a virtual environment utilizing full path space learning. In addition to the foregoing, embodiments can also be described in terms of flowcharts comprising acts and steps in a method for accomplishing a particular result. For example, FIGS. 9-10 illustrate flowcharts of exemplary methods in accordance with one or more embodiments. The methods described in relation to FIGS. 9-10 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of rendering digital images of a virtual environment utilizing full path space learning in accordance with one or more embodiments. In one or more embodiments, the method 900 is performed in a digital medium environment that includes the digital full path rendering system 700. The method 900 is intended to be illustrative of one or more methods in accordance with the present disclosure, and is not intended to limit potential embodiments. Alternative embodiments can include additional, fewer, or different steps than those articulated in FIG. 9.

As illustrated in FIG. 9, the method 900 includes an act 910 of sampling a first plurality of paths in a virtual environment. In particular, the act 910 can include sampling a first plurality of paths in a virtual environment to determine point estimations of light transfer between a light source and a camera perspective using a uniform distribution. For example, in one or more embodiments, the act 910 comprises sampling a plurality of paths originating from the light source and sampling a plurality of paths originating from the camera perspective. Moreover, the act 910 can include sampling a plurality of paths having a first number of segments; and sampling a plurality of paths having a second number of segments.

As illustrated in FIG. 9, the method 900 also includes an act 920 of approximating a global light transport function based on the first plurality of paths. In particular, the act 920 can include approximating a global light transport function across full light paths between the light source and the camera perspective using the determined point estimations. For example, in one or more embodiments, the act 920 comprises generating a first approximation of the global light transport function based on the plurality of paths originating from the light source; and generating a second approximation of the global light transport function based on the plurality of paths originating from the camera perspective. In addition, the act 920 can also include estimating the global light transport function by approximating the determined point estimations with a plurality of Gaussian functions.

Further, the act 920 can also include approximating the global light transport function with a first plurality of Gaussian functions having a first number of dimensions corresponding to the first number of segments; and approximating the global light transport function with a second plurality of Gaussian functions having a second number of dimensions corresponding to the second number of segments. Moreover, in one or more embodiments, the act 920 can also include combining the first plurality of Gaussian functions having the first number of dimensions and the second plurality of Gaussian functions having the second number of dimensions utilizing a combination weighting. In addition, the act 920 can also include distributing at least one of the first plurality of Gaussian functions having the first number of dimensions to a different dimension. Further, the act 920 can also include jointly fitting Gaussians with different dimensionality by aligning low dimensional Gaussians to high dimensional Gaussians by extending rest dimensionality with uniform distribution.

Moreover, in one or more embodiments, the act 920 comprises fitting a first Gaussian to a first determined point estimation; determining a first probability that a second determined point estimation should be assigned to the first Gaussian; determining a second probability that the second determined point estimation should be assigned to a new Gaussian; and based on which of the first probability or the second probability is larger: assigning the second determined point estimation to the first Gaussian and updating a coefficient of the first Gaussian; or fitting a second Gaussian to the second determined point estimation.

As illustrated in FIG. 9, the method 900 can also include an act 930 of sampling a second plurality of paths based on the approximated global light transport function. In particular, the act 930 can include sampling a second plurality of paths in the virtual environment using a non-uniform distribution based on the approximated global light transport function across full light paths. For example, in one or more embodiments, the act 930 comprises sampling an additional plurality of paths originating from the light source based on the first approximation of the global light transport function; and sampling an additional plurality of paths originating from the camera perspective based on the second approximation of the global light transport function.

Moreover, as shown in FIG. 9, the method 900 can also include an act 940 of creating a digital image based on the first plurality of paths and the second plurality of paths. In particular, the act 940 can include creating (e.g., rendering) a digital image of the virtual environment from the camera perspective based on the first plurality of paths and the second plurality of paths. For example, in one or more embodiments, the act 940 can include creating the digital image based on the additional plurality of paths originating from the light source and the additional plurality of paths originating from the camera perspective.

Furthermore, in one or more embodiments, the method 900 further comprises updating the approximated global light transport function based on the second plurality of paths; repeatedly sampling additional paths using a distribution based on the updated global light transport function; and repeatedly updating the updated global light transport function based on the sampled additional paths.

In addition, the method 900 can also include updating the approximated global light transport function across full light paths between the light source and the camera perspective by: determining new point estimations from the second plurality of paths; based on the new point estimations: updating coefficients of existing Gaussians; fitting new Gaussians to one or more of the new point estimations; and removing an empty Gaussian. In addition, in one or more embodiments, the method 900 include fitting a covariance of the new Gaussians to all of the determined point estimations and the new point estimations.

FIG. 10 illustrates a flowchart of a series of acts in a method 1000 of rendering digital images of a virtual environment utilizing full path space learning in accordance with one or more embodiments. The method 1000 includes an act 1010 of sampling a first plurality of paths in a virtual environment. In particular, the act 1010 can include sampling a first plurality of paths in a virtual environment with a light source and a camera perspective using a first distribution. For example, in one or more embodiments, the act 1010 comprises sampling a first plurality of paths in the virtual environment based on a uniform distribution.

As shown in FIG. 10, the method 1000 also includes an act 1020 of approximating a global light transport function based on the first plurality of paths. In particular, the act 1020 can include approximating a global light transport function across full light paths between the light source and the camera perspective based on the sampling of the first plurality of paths. For example, the approximated global light transport function can define probabilities that paths will transport light between the light source and the camera perspective. Indeed, in one or more embodiments, the act 1020 comprises generating a probability distribution function comprising a plurality of Gaussian functions that estimate the global light transport function.

As illustrated in FIG. 10, the method 100 also includes an act 1030 of sampling a second plurality of paths based on the approximated global light transport function. In particular, the act 1030 can include sampling a second plurality of paths in the virtual environment using a second distribution based on the approximated global light transport function across full light paths. For example, in one or more embodiments, the act 1030 comprises sampling a plurality of paths originating from the light source and sampling a plurality of paths originating from the camera perspective. In addition, the act 1030 can also include sampling a first plurality of paths having a first number of segments; and sampling a second plurality of paths having a second number of segments. In one or more embodiments, the act 1030 comprises sampling the second plurality of paths based on the probabilities (i.e., the probabilities defined by the approximated global light transport function).

In addition, as shown in FIG. 10, the method 1000 also includes an act 1040 of updating the approximated global light transport function based on the second plurality of paths. In particular, the act 1040 can include updating the approximated global light transport function across full light paths between the light source and the camera perspective based on the sampling of the second plurality of paths. For example, in one or more embodiments, the act 1040 comprises updating a first approximated global light transport function based on the plurality of paths originating from the light source; and updating a second approximated global light transport function based on the plurality of paths originating from the camera perspective.

Moreover, the act 1040 can also include estimating the global light transport function with a plurality of Gaussian functions by: determining, based on the second plurality of paths, a number of initial Gaussian functions, the initial Gaussian functions having a position, and a variance; and utilizing the number, the position, and the variance of the initial Gaussian functions to generate the plurality of Gaussian functions.

Furthermore, the act 1040 can also include estimating the global light transport function with a first plurality of Gaussian functions having a first dimension corresponding to the first number of segments; and estimating the global light transport function with a second plurality of Gaussian functions having a second dimension corresponding to the second number of segments; and combining the first plurality of Gaussian functions having the first dimension and the second plurality of Gaussian functions having the second dimension utilizing a combination weighting.

As illustrated in FIG. 10, the method 1000 also includes an act 1050 of repeatedly sampling additional paths based on the updated global light transport function. In particular, the act 1050 can include repeatedly sampling additional paths using distributions based on the updated global light transport function and repeatedly updating the updated global light transport function based on the sampled additional paths.

Further, as shown in FIG. 10, the method 1000 also includes an act 1060 of creating a digital image based on the first plurality of paths, the second plurality of paths, and the additional paths. In particular, the act 1060 can include creating a digital image of the virtual environment from the camera perspective based on the first plurality of paths, the second plurality of paths, and the additional paths. For example, in one or more embodiments, the act 1060 comprises creating the digital image based on the plurality of paths originating from the light source and the plurality of paths originating from the camera perspective.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
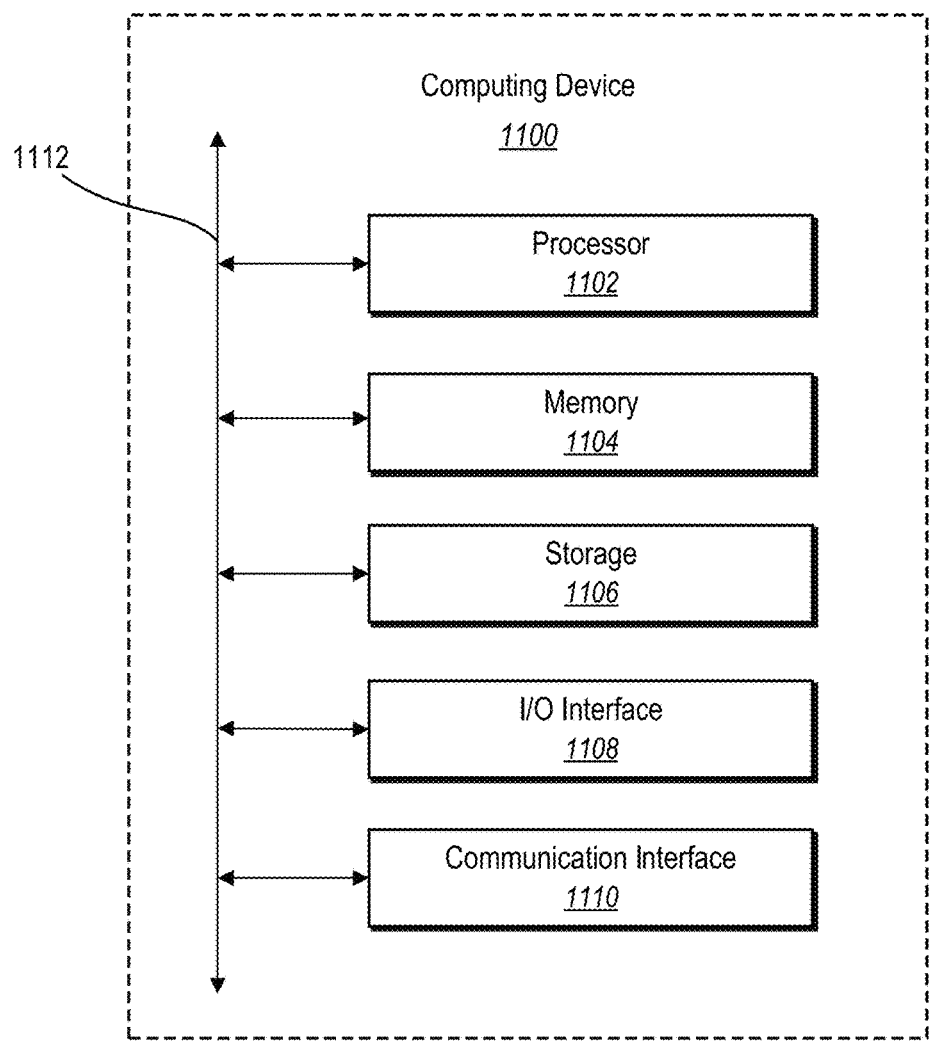
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that the digital full path rendering system 700 can comprise implementations of the computing device 1100. As shown by FIG. 11, the computing device can comprise a processor 1102, memory 1104, a storage device 1106, an I/O interface 1108, and a communication interface 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a stylus or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment, a computer-implemented method of efficiently rendering virtual environments utilizing full path space learning, comprising:

sampling, in a virtual environment, a first plurality of paths having a first number of segments and a second plurality of paths having a second number of segments to determine point estimations of light transfer between a light source and a camera perspective;

approximating a global light transport function across full light paths between the light source and the camera perspective using the determined point estimations by generating a first plurality of Gaussian functions having a first number of dimensions corresponding to the first number of segments and a second plurality of Gaussian functions having a second number of dimensions corresponding to the second number of segments;

sampling a third plurality of paths in the virtual environment using a non-uniform distribution based on the approximated global light transport function across full light paths; and creating a digital image of the virtual environment from the camera perspective based on the first plurality of paths, the second plurality of paths, and the third plurality of paths.

2. The method of claim 1, further comprising:

updating the approximated global light transport function based on the second third plurality of paths;

repeatedly sampling additional paths using a distribution based on the updated global light transport function; and repeatedly updating the updated global light transport function based on the sampled additional paths.

3. The method of claim 1, wherein sampling the first plurality of paths and the second plurality of paths comprises sampling a plurality of paths originating from the light source and sampling a plurality of paths originating from the camera perspective.

4. The method of claim 3, wherein approximating the global light transport function comprises:
generating a first approximation of the global light transport function based on the plurality of paths originating from the light source; and
generating a second approximation of the global light transport function based on the plurality of paths originating from the camera perspective.

5. The method of claim 4, wherein:
sampling the third plurality of paths in the virtual environment based on the approximated global light transport function across full light paths comprises:
sampling an additional plurality of paths originating from the light source based on the first approximation of the global light transport function; and
sampling an additional plurality of paths originating from the camera perspective based on the second approximation of the global light transport function; and
creating the digital image of the virtual environment from the camera perspective based on the first plurality of paths, the second plurality of paths, and the third plurality of paths comprises: creating the digital image based on the additional plurality of paths originating from the light source and the additional plurality of paths originating from the camera perspective.

6. The method of claim 1, wherein approximating the global light transport function comprises:
utilizing a Dirichlet process to generate a first number of Gaussian functions based on the determined point estimations; and
approximating the global light transport function comprises generating the first plurality Gaussian functions and the second plurality of Gaussian functions based on the determined point estimations and the first number of Gaussian functions determined utilizing the Dirichlet process.

7. The method of claim 6, wherein utilizing the Dirichlet process to generate the first number of Gaussian functions comprises:
determining a first probability that a point estimation of the determined point estimations corresponds to an existing Gaussian; and
determining a second probability that the point estimation corresponds to a new Gaussian.

8. The method of claim 7, wherein utilizing the Dirichlet process to generate the first number of Gaussian functions comprises:
based on the first probability and the second probability performing at least one of:
assigning the point estimation to the existing Gaussian and updating a coefficient of the existing Gaussian; or
fitting the new Gaussian to the point estimation.

9. The method of claim 8, wherein approximating the global light transport function comprises distributing at least one of the first plurality of Gaussian functions having the first number of dimensions to a different dimension.

10. The method of claim 1, wherein approximating the global light transport function comprises combining the first plurality of Gaussian functions having the first number of dimensions and the second plurality of Gaussian functions having the second number of dimensions utilizing a combination weighting.

11. In a digital medium environment, a computer-implemented method of efficiently rendering virtual environments utilizing full path space learning, comprising:
sampling a first plurality of paths in a virtual environment with a light source and a camera perspective using a first distribution;
utilizing a Dirichlet process to determine a first number of Gaussian functions based on the first plurality of paths;
approximating a global light transport function across full light paths between the light source and the camera perspective by generating a first plurality of Gaussian functions based on the first plurality of paths and the first number of Gaussian functions determined utilizing the Dirichlet process;
sampling a second plurality of paths in the virtual environment using a second distribution based on the approximated global light transport function across full light paths;
utilizing the Dirichlet process to determine a second number of Gaussian functions based on the second plurality of paths;
updating the approximated global light transport function across full light paths between the light source and the camera perspective by generating a second plurality of Gaussian functions based on the second plurality of paths and the second number of Gaussian functions determined utilizing the Dirichlet process;
repeatedly sampling additional paths using distributions based on the updated global light transport function and repeatedly updating the updated global light transport function based on the sampled additional paths; and
creating a digital image of the virtual environment from the camera perspective based on the first plurality of paths, the second plurality of paths, and the additional paths.

12. The method of claim 11, wherein:
the approximated global light transport function comprises the first plurality of Gaussian functions reflecting probabilities that paths transport light between the light source and the camera perspective; and
sampling the second plurality of paths comprises: sampling the second plurality of paths based on the probabilities.

13. The method of claim 11, wherein:
sampling the second plurality of paths comprises sampling a plurality of paths originating from the light source and sampling a plurality of paths originating from the camera perspective;
updating the approximated global light transport function across light paths comprises:
updating a first approximated global light transport function based on the plurality of paths originating from the light source; and
updating a second approximated global light transport function based on the plurality of paths originating from the camera perspective; and
creating the digital image of the virtual environment from the camera perspective comprises: creating the digital image based on the plurality of paths originating from the light source and the plurality of paths originating from the camera perspective.

14. The method of claim 11, wherein
utilizing the Dirichlet process to determine the first number of Gaussian functions further comprises determining, based on the second plurality of paths, positions of the first number of Gaussian functions and variances of the first number of Gaussian functions; and
approximating the global light transport function comprises generating the first plurality of Gaussian functions based on the positions and the variances of the first number of Gaussian functions.

15. The method of claim 11, wherein:
sampling the second plurality of paths comprises:
  sampling a first set of paths having a first number of segments; and
  sampling a second set of paths having a second number of segments; and
updating the approximated global light transport function across full light paths comprises:
  estimating the global light transport function with a first set of Gaussian functions having a first dimension corresponding to the first number of segments;
  estimating the global light transport function with a second set of Gaussian functions having a second dimension corresponding to the second number of segments; and
  combining the first set of Gaussian functions having the first dimension and the second set plurality of Gaussian functions having the second dimension utilizing a combination weighting.

16. A system for efficiently rendering virtual environments utilizing full path space learning, comprising:
at least one processor; and
at least one non-transitory computer readable storage medium storing instructions thereon, that, when executed by the at least one processor, cause the system to:
  sample a first plurality of paths in a virtual environment to determine point estimations of light transfer between a light source and a camera perspective;
  utilize a Dirichlet process to determine, based on the point estimations of light transfer between the light source and the camera perspective, a first number of Gaussian functions with first locations and first variances by:
    determining a first probability that a determined point estimation corresponds to a first Gaussian;
    determining a second probability that the determined point estimation corresponds to a new Gaussian;
    based on the first probability and the second probability, assigning the determined point estimation to the new Gaussian;
  approximate a global light transport function across full light paths between the light source and the camera perspective by generating a plurality of Gaussian functions based on the point estimations of light transfer between the light source and the camera perspective and the first number of Gaussians with the first locations and the first variances determined utilizing the Dirichlet process;
  sample a second plurality of paths in the virtual environment using a distribution based on the approximated global light transport function across full light paths; and
  render a digital image of the virtual environment from the camera perspective based on the first plurality of paths and the second plurality of paths.

17. The system of claim 16, further comprising instructions that, when executed by the at least one processor, cause the system to update the approximated global light transport function across full light paths between the light source and the camera perspective by:
  determining new point estimations from the second plurality of paths; and
  utilizing the Dirichlet process to generate a second number of Gaussian functions based on the new point estimations by:
    updating coefficients of existing Gaussians;
    fitting new Gaussians to one or more of the new point estimations; and
    removing an empty Gaussian.

18. The system of claim 17, further comprising instructions, that when executed by the at least one processor, cause the system to
sample the first plurality of paths by:
  sampling a first set of paths having a first number of segments; and
  sampling a second set of paths having a second number of segments; and
approximate global light transport by:
  estimating the global light transport function with a first set of Gaussian functions having a first dimension corresponding to the first number of segments; and
  estimating the global light transport function with a second set of Gaussian functions having a second dimension corresponding to the second number of segments.

19. The system of claim 18, further comprising instructions that, when executed by the at least one processor, cause the system to jointly fit Gaussians with different dimensionality by aligning a low dimensional Gaussian to a high dimensional Gaussians.

20. The system of claim 17, further comprising instructions that, when executed by the at least one processor, cause the system to:
  repeatedly sample additional paths using distributions based on the updated global light transport function; and
  repeatedly update the updated global light transport function based on the sampled additional paths.

* * * * *